United States Patent [19]

Nakagawa et al.

[11] Patent Number: 5,724,159
[45] Date of Patent: Mar. 3, 1998

[54] IMAGE READING DEVICE PROVIDED WITH STRUCTURAL FEATURES FOR FIXING THE READING UNIT DURING TRANSPORT

[75] Inventors: Kunihiko Nakagawa; Hiroshi Nakao, both of Nagaokakyo, Japan

[73] Assignee: Mitsubishi Denki Kabushiki Kaisha, Tokyo, Japan

[21] Appl. No.: 684,822

[22] Filed: Jul. 22, 1996

Related U.S. Application Data

[62] Division of Ser. No. 229,715, Apr. 19, 1994, Pat. No. 5,585,937.

[30] Foreign Application Priority Data

| Apr. 21, 1993 | [JP] | Japan | 5-094355 |
| Nov. 16, 1993 | [JP] | Japan | 5-311142 |
| Dec. 6, 1993 | [JP] | Japan | 5-340145 |

[51] Int. Cl.⁶ .................. H04N 1/028; H04N 1/04; H04N 1/10
[52] U.S. Cl. .................. 358/474; 358/494; 358/497
[58] Field of Search .................. 358/474, 494, 358/497

[56] References Cited

U.S. PATENT DOCUMENTS

| 3,837,743 | 9/1974 | Amemiya . |
| 4,338,022 | 7/1982 | Farago . |
| 4,870,294 | 9/1989 | Hasegawa . |
| 4,875,104 | 10/1989 | Kamon . |
| 4,924,259 | 5/1990 | Wise . |
| 5,140,443 | 8/1992 | Iwahara et al. . |
| 5,291,312 | 3/1994 | Aikawa et al. . |
| 5,335,093 | 8/1994 | Imoto . |
| 5,420,700 | 5/1995 | Maeda et al. . |

FOREIGN PATENT DOCUMENTS

| 4-36363 | 3/1992 | Japan . |
| 4-109748 | 4/1992 | Japan . |
| 5-16758 | 5/1993 | Japan . |
| 5-252347 | 9/1993 | Japan . |

Primary Examiner—Scott A. Rogers

[57] ABSTRACT

An image reading device comprises: a frame; a reading unit provided with a line sensor for reading a text image; a guide member fixed to the frame for supporting the reading unit such that the reading unit is free to slide in a predetermined direction; and a stay fixed to the frame. A screwhole is formed at a predetermined position in the reading unit, a first throughhole is formed in the frame coaxially with the screwhole, and a second throughhole is formed in the stay coaxially with the screwhole and the first throughout. Further, an elastic member having a third throughhole engages with the first throughhole in the frame, and a holding member is provided comprising a grip of large diameter and a screw of small diameter. The reading unit is fixed, when the image reading device is transported, by screwing the screw into the screwhole of the reading unit through the second throughhole of the stay and through the third throughhole of the elastic member.

6 Claims, 39 Drawing Sheets

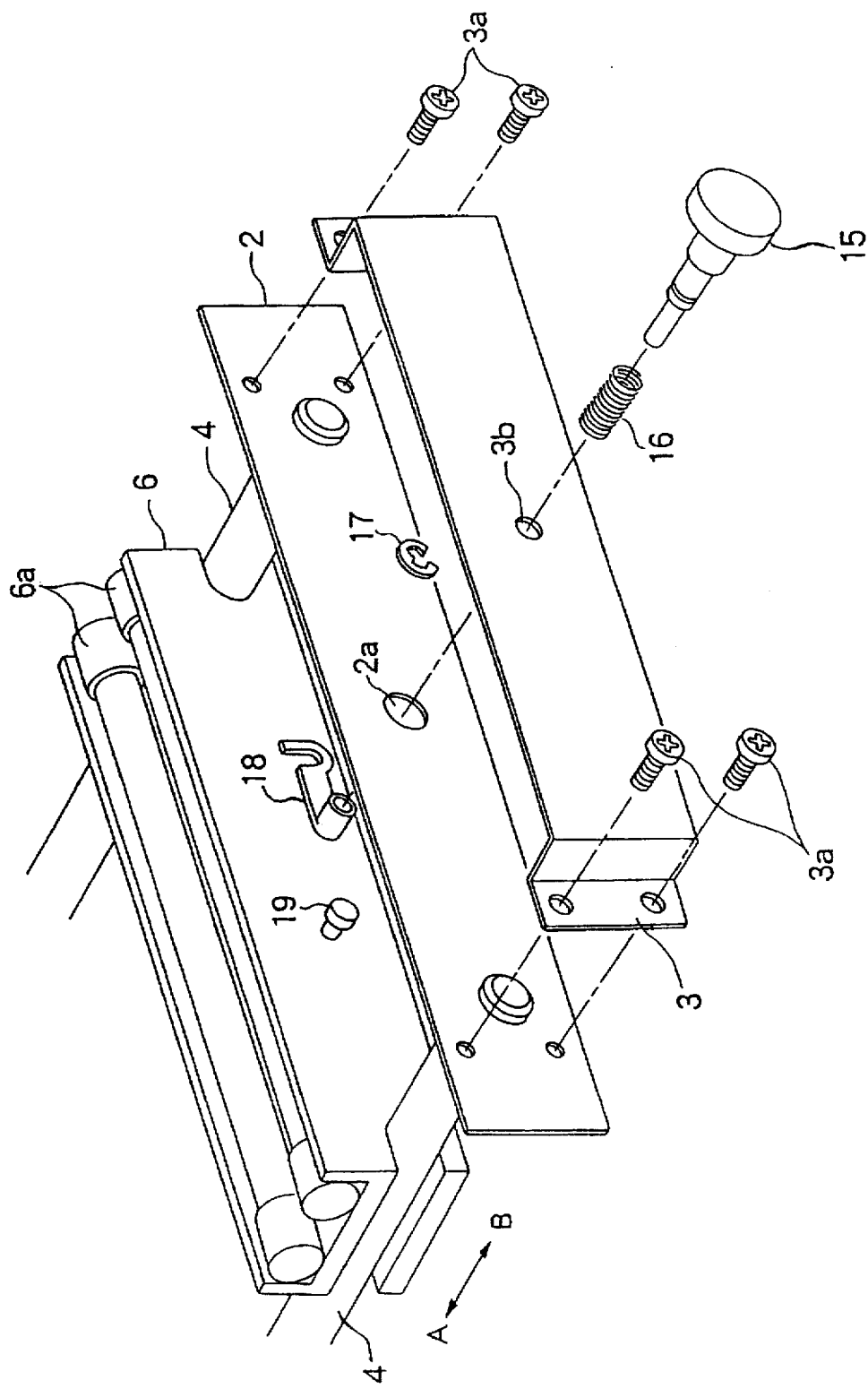

IMAGE READING DEVICE PROVIDED WITH STRUCTURAL FEATURES FOR FIXING THE READING UNIT DURING TRANSPORT

This application is a divisional of application Ser. No. 08/229,715, filed on Apr. 19, 1994, now U.S. Pat. No. 5,585,937, the entire contents of which are hereby incorporated by reference.

BACKGROUND OF THE INVENTION

The present invention relates to an image reading device which optically reads a text image by moving an image reading unit on which a line sensor and a light source for text illuminating is mounted specifically, it relates to a mechanism which holds the image reading unit such that it cannot move when the device is transported.

The present invention also relates to an image reading device which reads a text image by moving an image reading unit specifically, more it relates to the structure of a reducing or magnifying optical system with which the image reading unit is provided.

The present invention further relates to an image reading device which continuously reads a transparent text such as a photographic film, and oral puts the data as an intake signal.

FIG. 47 is a perspective view which schematically shows a mechanism for holding a reading unit when an image reading device is transported. As shown in the figure, in the conventional reading device, a reading unit 201 having a light source 201a or a line sensor (not shown in the figure) moves in a direction A or B along a guide shaft 203 fixed to a frame 202 (A indicates a front side off the image reading device, and B indicates a rear side or of the device). A screwhole 201b is formed at the rear surface of the reading unit 201, and a throughole 202a is formed in the frame 202 coaxially with the screwhole 201b. A stay 204 is fixed to the frame 202 by means of fixing screws 204a, and a throughhole 204b is formed in the stay 204 coaxially with the screwhole 201b in the reading unit 201 and the throughhole 202a in the frame 202. When the image reading device is transported, the reading unit 201 is fixed by screwing a retaining screw 205 having a thread 205a into the hole 201b via the throughhole 204b of the stay 204 and the throughhole 202a of the frame 202 so that the reading unit 201 cannot move with respect to the guide shaft 203, thereby preventing damage or distortion of the optical system.

FIG. 48 is a sectional view which schematically shows the structure of a reading unit 211 in another conventional image reading device. As shown in the figure, the reading unit 211 comprises a frame 212 that prevents intrusion of stray light from outside the device, and light sources 213 provided in the upper part of the frame for illuminating the text. The frame 212 contains fixed mirrors 217, 218, 219 that reflect light from a text 216 mounted on a glass plate 214 and clamped from above by a cover 215, a lens tube 220 made up of lenses, a fixed mirror 221 and a line sensor 222. In the reading unit 211 having the above construction, light L from the text 216 impinges on lenses lens tube 220 via fixed mirrors 217, 218, 210, is made to converge by the lens tube 220, and forms an image via the fixed mirror 221 on the image-forming surface of the line sensor 222 where the image is converted to an electrical signal. As the reading unit 211 moves in a direction A, it reads image information on the text 216 one line at a time, converts it to an electrical signal, and outputs this signal to a printer, a display device or the like.

FIG. 49 is a perspective view showing a mechanism used for moving the optical parts which provide the reading unit in FIG. 48 with reducing or magnifying function, as is disclosed for example in Japanese Utility Model Kokoku Publication H5-16758 (16758/1998). As shown in FIG. 49, a wire rope 226 wound around a drive pulley 224 and a driven pulley 225, and a wire rope 229 wound around a drive pulley 227 and a driven pulley 228, are respectively attached to the two ends of a moving member 223 on which optical parts such as mirrors and a lens tube are mounted. The moving member 223 moves in the direction on A or B by the rotational drive force of a motor 232 which is transmitted to a shaft 231 between the drive pulleys 224, 227 via a belt 230.

FIG. 50 to FIG. 56 are diagrams off another conventional image read device. FIG. 50 and FIG. 51 are views in perspective schematically showing the external appearance of the image reading device. FIG. 52 to FIG. 54 are diagrams showing the process of inserting a film in a film holder, and mounting it on a stage. FIG. 55 is a schematic view in section showing the construction of the drive part of the stage. FIG. 56 is a schematic view in section showing the construction of the optical system used for reading an image on a film.

In this image reading device, when a film 242 is inserted, an illuminating part 243 is first raised as shown in FIG. 51; the film 242 is inserted in the film holder 244 so that one frame is in the window 244a of the holder 244 as shown in FIG. 52; the holder 244 is inserted in a stage 245 on a horizontal surface 241 as shown in FIG. 53; and the illuminating part 243 is then lowered to close it as shown in FIG. 54. When the stage 245 is moved in a slit 241a on the horizontal surface 241, the holder 244 and the film 242 which is gripped in the holder are displaced, and one frame of the film 242 is read.

The mechanism which displaces the stage 245 comprises a stepping motor 247 fixed to a base 246, a lead screw 249 connected to the stepping motor 247 via a joint 248 and a nut 250 connected to the stage 245, this nut 250 screwing onto the lead screw 249 as shown in FIG. 55. The stage 245 is displaced in a direction G by driving the stepping motor 247. The optical system for reading an image on the film 242 comprises a lamp unit 251, a mirror 252, a lens unit 253 and a CCD line sensor 254 as shown in FIG. 56.

However, in the conventional image reading device shown in FIG. 47, there was a problem in that a screwdriver or other tool was required to attach or remove the retaining screw 205. Moreover, the retaining screw 205 had to be carefully kept after it was removed so that it was not lost, and after removing it, dust and dirt were liable to enter the image reading device through the throughholes 204b, 202a which were thereby left open.

Further, in the conventional image reading device shown in FIG. 48 and FIG. 49, if the drive pulleys 224, 227 and the wire ropes 226, 229 should slip, or if the diameters of the drive pulleys 224, 227 or those of the wire ropes 226, 229 are slightly different, an error occurs in the displacement amount of the wire ropes 226, 229 so that the moving member 223 inclines at an angle δ to a reference line 233 perpendicular to the direction of motion this would, thereby give rise to distortion in the image reading by the line sensor.

Further, in the conventional image reading device shown in FIG. 50 to FIG. 56, when one frame on the film has been read and it is desired to read the next frame, the operator has to raise the illumination part 243, remove the bolder 244 from the stage 245, insert the film 242 in the holder 244 so that the next frame is in the window 244a of the holder 244, re-insert the holder 244 in the stage 245, and then lower the illumination part 243. This sequence of operations was troublesome to perform, and took a great deal of time. In addition, the slit 241a had to be provided in the horizontal surface 241 to scan the film 242 while moving the stage 245 on the surface 241 of the image reading device. It was therefore difficult to make the image reading device compact, and in particular, if it was desired to to enlarge the window of the holder 244 or increase the number of windows so that a plurality of frames of the film 242 could be read continuously, it was even more difficult to make the image reading device compact.

SUMMARY OF THE INVENTION

It is an object of the present invention to provide an image reading device which saves the operator trouble when the device is transported.

It is another further object of the present invention to render it easier to store parts.

It is still another object of the present invention to provide an image reading device into which dust and dirt cannot easily intrude.

It is a further object of the present invention to provide an image reading device wherein optical parts such as mirrors and a lens tube can moved with high precision.

It is a still further object of the present invention to provide an image reading device wherein a plurality of frames may be read continuously without re-inserting a film, and which in addition may be made compact.

According to one aspect of the present invention, an image reading device comprises: a frame; a reading unit provided with a line sensor for reading a text image; a guide member fixed to the frame for supporting the reading unit such that the reading unit is free to slide in a predetermined direction; and a stay fixed to the frame. A screwhole is formed at a predetermined position in the reading unit, a first throughhole is formed in the frame coaxially with the screwhole, and a second throughhole is formed in the stay coaxially with the screwhole and the first throughhole. An elastic member having a third throughhole engages with the first throughhole in the frame, and a holding member is provided comprising a grip of large diameter and a screw of small diameter. The reading unit is fixed. When the image reading device is transported, by screwing the screw into the screwhole of the reading unit through the second throughhole of the stay and through the third throughhole of the elastic member. In this image reading device, when the device is transported, the screw of a holding member is passed through a second throughhole of a stay and a third throughhole of an elastic member, and a large diameter grip is rotated to engage the holding member with the screwhole of a reading unit so that the reading unit is brought into contact with the elastic member, thereby fixing the unit. External shocks to which the device may be subjected during transport therefore do not easily affect the reading unit, and damage to or distortion of the structure of the reading unit is prevented. When the device is used, the large diameter grip of the holding member is rotated manually so that the screwhole of the reading unit and the holding member are disengaged.

The image reading device may further comprise: a compression spring provided on the outer side of the stay which pushes the holding member towards the outside of the image reading device; and a clip provided on the holding member which comes into contact with the inner side of the stay when the screwhole of the reading unit and the screw of the holding member are disengaged. In this image reading device, when a screwhole of a reading unit and a screw of a holding member are disengaged, a holding member is retained by a stay due to a compression spring which pushes the member towards the outside of the device, and by a clip in contact with the inner surface of the stay. When the device is used, therefore, there is no need to remove and store the holding member, and the operator has less work to perform. Dust and dirt are also prevented from entering the device via throughholes.

According to another aspect of the present invention, an image reading device comprises: a frame; a reading unit carrying a line sensor for reading a text image; a guide member fixed to the frame for supporting the reading unit such that the reading unit is free to slide in a predetermined direction; and a stay fixed to the frame. A projection-its provided at a predetermined position on the reading unit, a first throughhole is formed in the frame, and a second throughhole is formed in the stay coaxially with the first throughhole. The image reading device further comprises: a holding member passing through the first throughhole in the frame and the second throughhole in the stay, the holding member having a hook at its end and a grip on the outer side of the stay, and the hook being rotated so as to engage with the projection by rotating the grip when the image reading device is transported; a compression spring provided on the outer side of the stay which pushes the holding member towards the outside of the image reading device; and a clip provided on the holding member which comes into contact with the inner side of the stay. In this image reading device, when the image reading device is transported, a grip is rotated so as to turn a hook which engages with a projection on a reading unit and thereby fixes the unit. A large diameter grip of a holding member is provided so that; a screwdriver or other tool is not required when attaching or removing the member, and the effort required by; the operator may be reduced. Further, when a hook and a projection are disengaged, the holding member is held against a stay by means of a compression spring which pushes the member toward the outside of the device, and by a clip in contact with the inner surface of the stay. When the device is used, therefore, there is no need to remove and store the holding member, the operator has less work to perform, and dust and dirt are prevented from entering the interior of the device via throughholes.

The the image reading device further comprise: a motor providing a drive force which drives the reading unit along the guide member; and a circuit board which processes a signal output by the line sensor. Preferably, the motor and the circuit board are installed in positions on the opposite side to the position at which the reading unit is fixed by the holding member. In the image reading device, a motor and circuit board are installed at positions on the opposite side to the position at which a reading unit is fixed by a holding member, thereby preventing unbalanced loads. .

According to yet another aspect of the present invention, a reading unit for an image reading device comprises: a lens tube for forming a text image; a line sensor for detecting the image formed by the lens tube and converting the image to an electrical signal; a reducing/magnifying mechanism for changing the magnification of the image detected by the line sensor; a guide member for supporting the lens tube such that it is free to move in a predetermined direction inside the reading unit; a displacing mechanism for moving the lens tube along the guide member from a first position wherein the optical path length to the line sensor is long, to a second position wherein the optical path length to the line sensor is short, or vice versa; a movable mirror which alternates between a third position wherein it reflects light from a text into the lens tube, and a fourth position which is not on the optical path of the light from the text; a drive mechanism synchronized with the action of the displacing mechanism which moves the lens tube, the drive mechanism setting the movable mirror in the third position when the lens tube is in the first position, and setting the movable mirror in the fourth position when the lens tube is in the second position; and a fixed mirror which guides light from a text to the lens tube when the lens tube is in the second position, and provides a longer optical path than the optical path from the text to the lens tube when the lens tube is in the first position. In this reading unit, the lens tube is moved by means of a displacing mechanism along the guide member from the first position to the second position or vice versa, and the movable mirror is moved by a mechanism linked to the displacing mechanism between the third position wherein it reflects light from a text into the lens tube, and the fourth position not on the optical path of the light from the text. When the lens tube is in the first position, light from the text enters the lens tube via the movable mirror which is in the third position. On the other hand, when the lens tube is in the second position, light from the text does not strike the movable mirror which is in the fourth position, but is reflected from a fixed mirror into the lens tube over a long optical path. A lens tube Is moved by means of a displacing mechanism along a guide member, and a movable mirror is moved by a mechanism linked to the displacing mechanism between predetermined positions. The mirror, lenses, and other optical parts are therefore displaced by precise amounts, which prevents distortion in the image read by a line sensor.

According to another aspect of the present invention, an image reading device comprises: a line sensor for optically reading an image on a film text having a plurality of image frames, and converting the image to an electrical signal; a film holder having a plurality of windows at positions corresponding to image frames, the film holder holding the film text such that the image frames are visible through the windows; a rail provided underneath the film holder; a film holder drive member supported such that the drive member is free to rotate about an axis oriented perpendicular to the longitudinal direction of the rail, the outer circumference of the drive member being in contact with the rail; a drive mechanism for rotating the film holder drive member; and an attracting member for generating a magnetic attractive force between the rail and the film holder drive member. In the image reading device, the plurality of windows are provided corresponding to image frames, and the rail is provided underneath the film holder holding the film so that the image frames can be viewed through these windows. A film holder drive member is provided wherein the outer circumference there of is in contact with the rail and is held against the rail magnetically finally, and the film holder drive member is rotated so that the image can be read by the line sensor as the film bolder is displaced. A plurality of image frames on the film can heretofore be read automatically through the windows of the film holder. Further, as the film holder is displaced due to the rotation of the drive member, the device can be made compact.

These and other objects of the present application will become more readily apparent from the detailed description given hereinafter. However, it should be understood that the preferred embodiments of the invention are given by way of illustration only, since various changes and modifications within the spirit and scope of the invention will become apparent to those skilled in the art from this detailed description.

BRIEF DESCRIPTION OF THE DRAWINGS

FIG. 12 is a perspective view schematically showing the essential features of a holding mechanism of a reading unit of an image reading device according to a third embodiment of the present invention.

DETAILED DESCRIPTION OF THE INVENTION

Preferred embodiments of the present invention will be described with reference to the attached drawings.

First Embodiment

Figure 1:
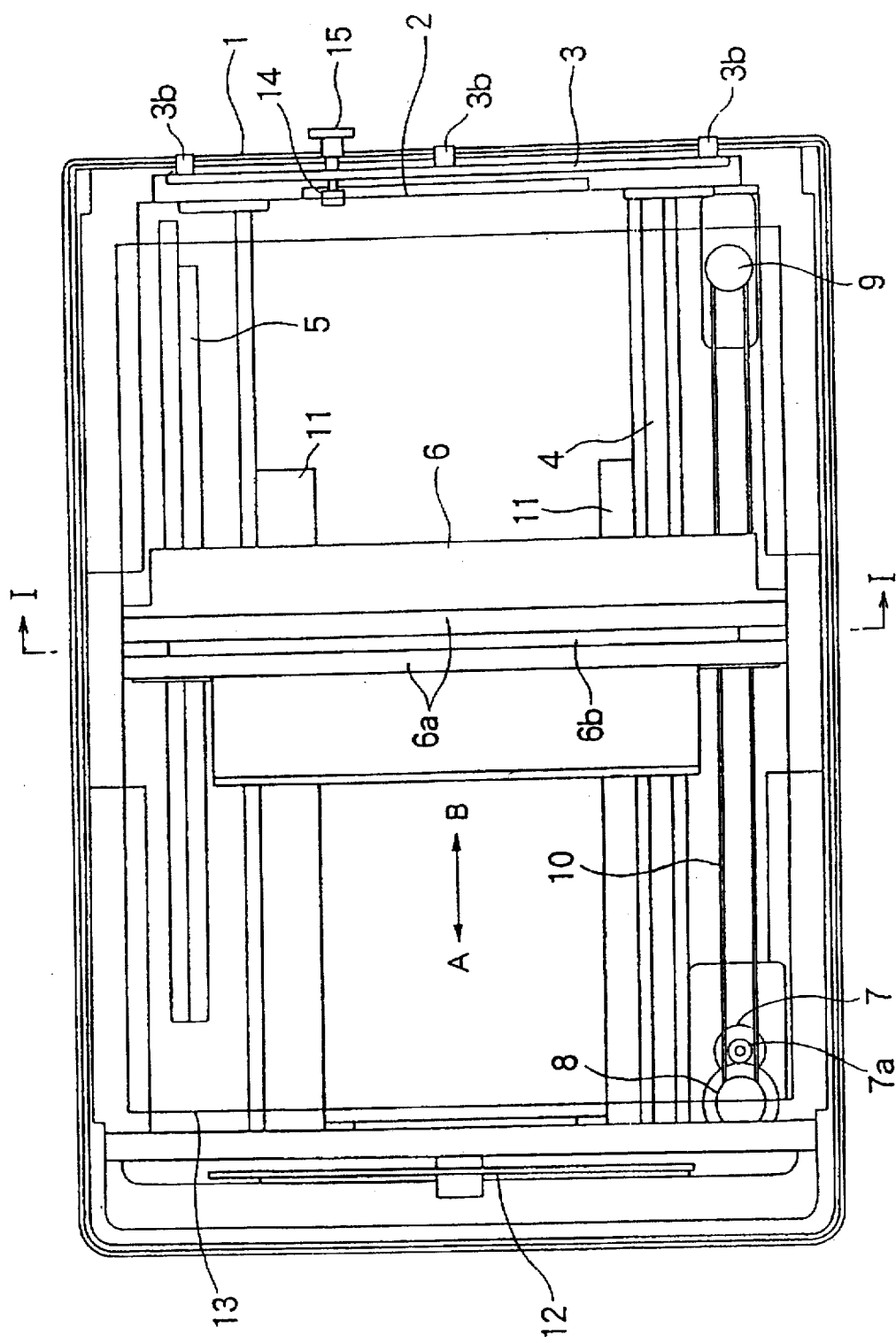
FIG. 1 is a plan view showing the essential features of an image reading device according to a first embodiment of the present invention with the upper part of the chassis cut away.
Figure 2:
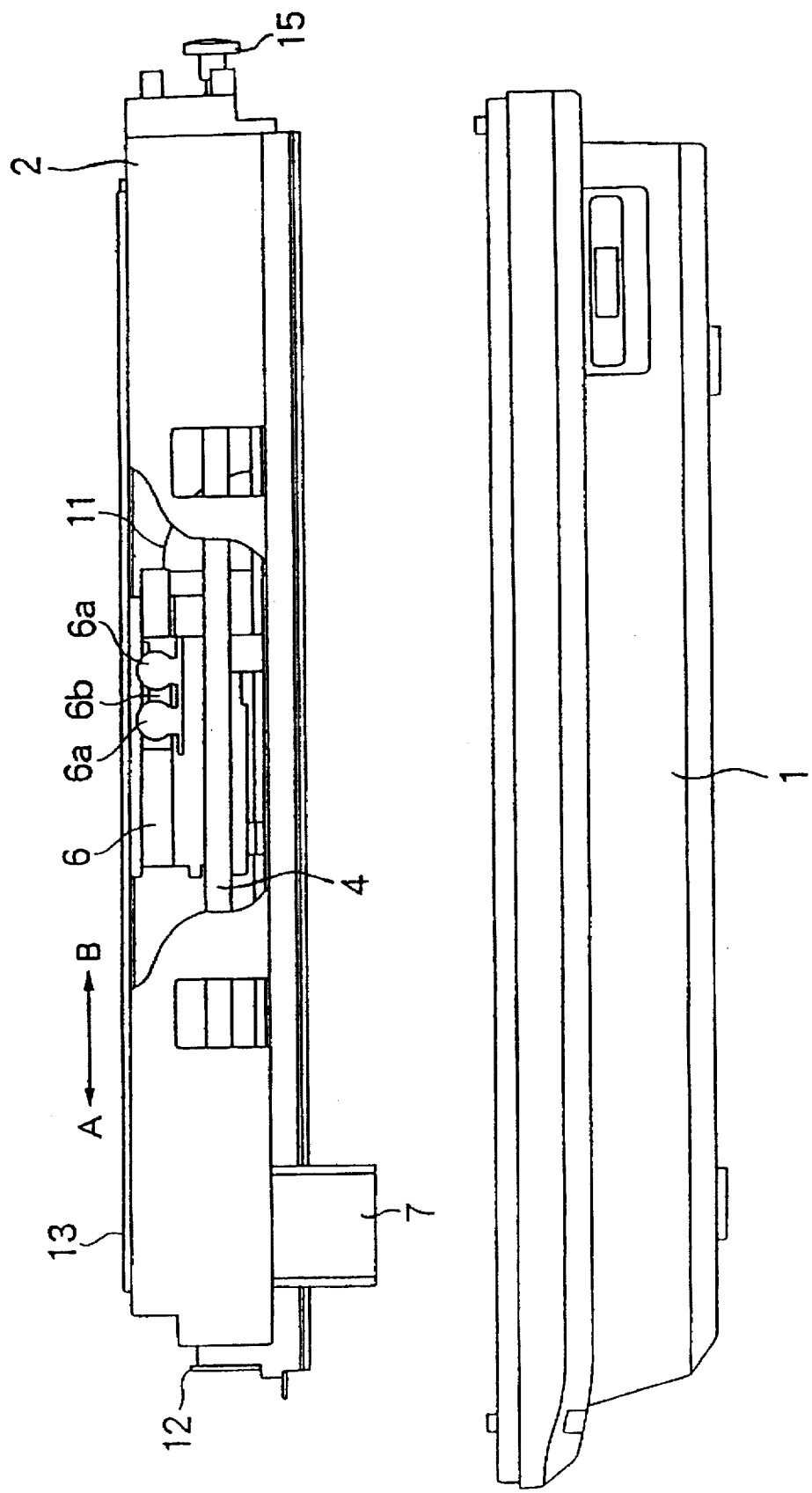
FIG. 2 is a plan view showing time essential features of the image reading device according to the first embodiment with the lower part of the chassis removed.
Figure 3:
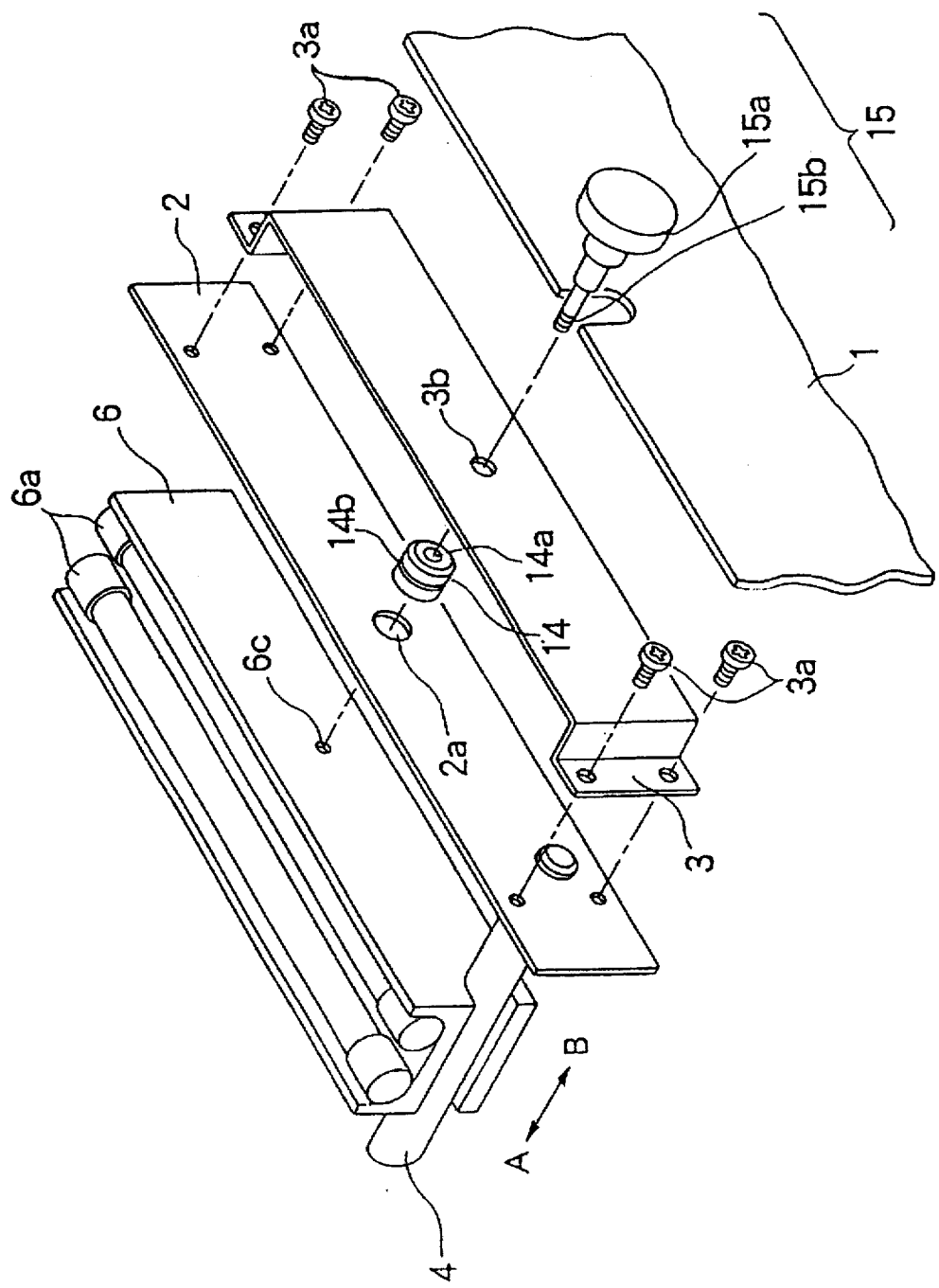
FIG. 3 is a perspective view schematically showing the essential features of a holding mechanism of a reading unit of the image reading device according to the first embodiment.
Figure 4:
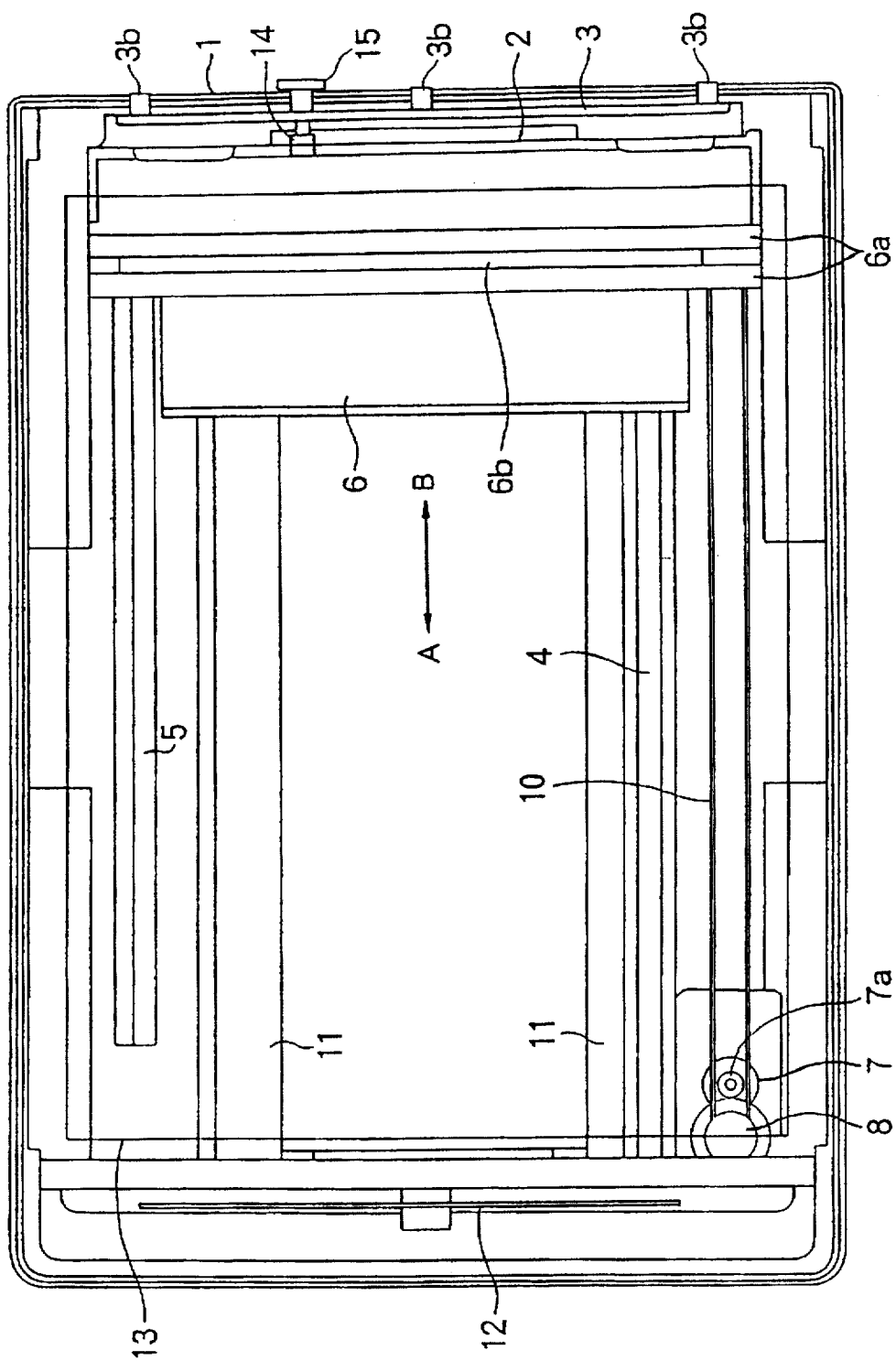
FIG. 4 is a plan view showing, in outline, how the reading unit of the image reading device according to the first embodiment is held.
Figure 5A:
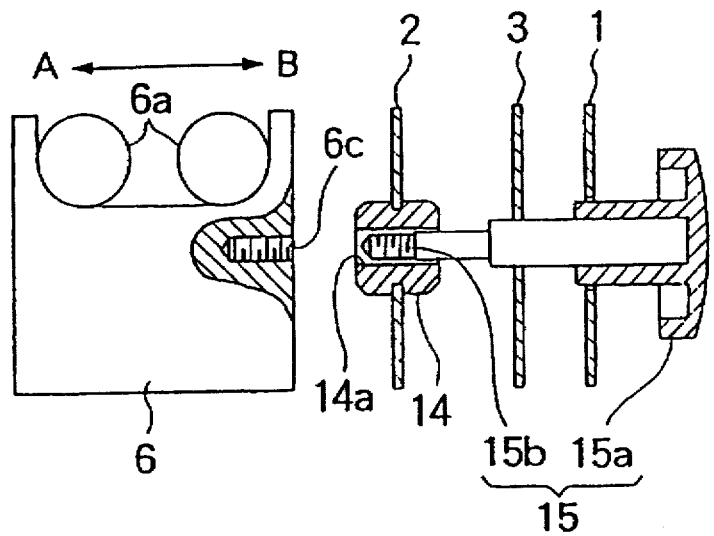
FIGS. 5A and 5B are sections showing the essential features of the holding mechanism of the reading unit of the image reading device according to the first embodiment.
Figure 5B:
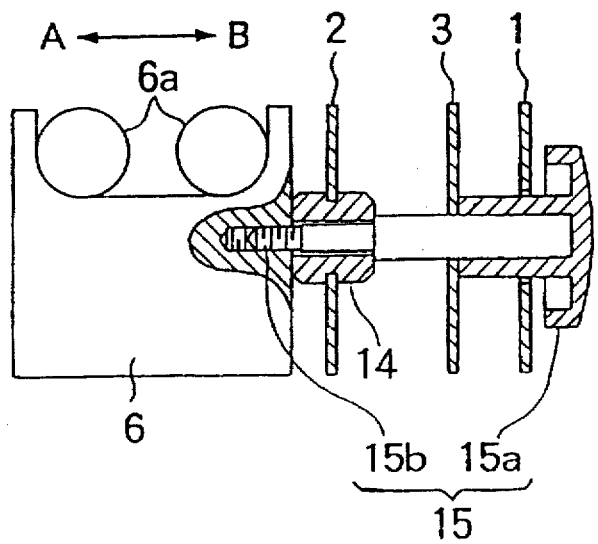
Figure 6:
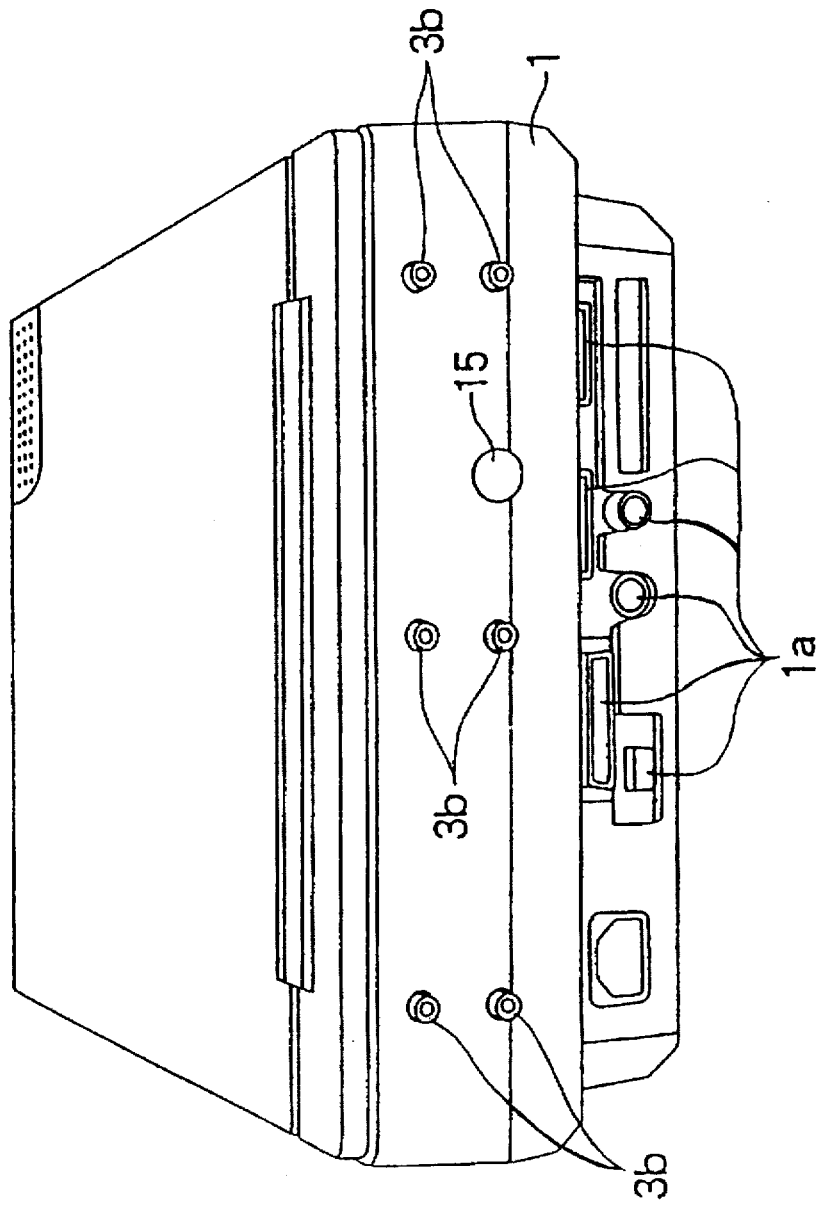
FIG. 6 is a perspective view schematically showing the rear of the image reading device according to the first embodiment.
Figure 7:
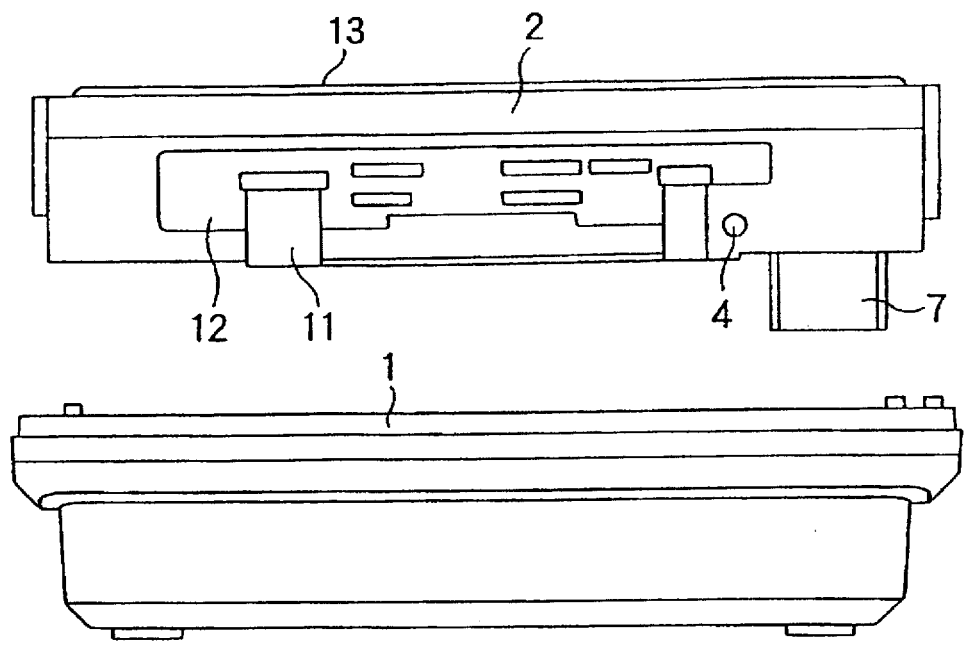
FIG. 7 is a schematic front view of the image reading device according to the first embodiment with the lower part of the chassis removed.
Figure 8:
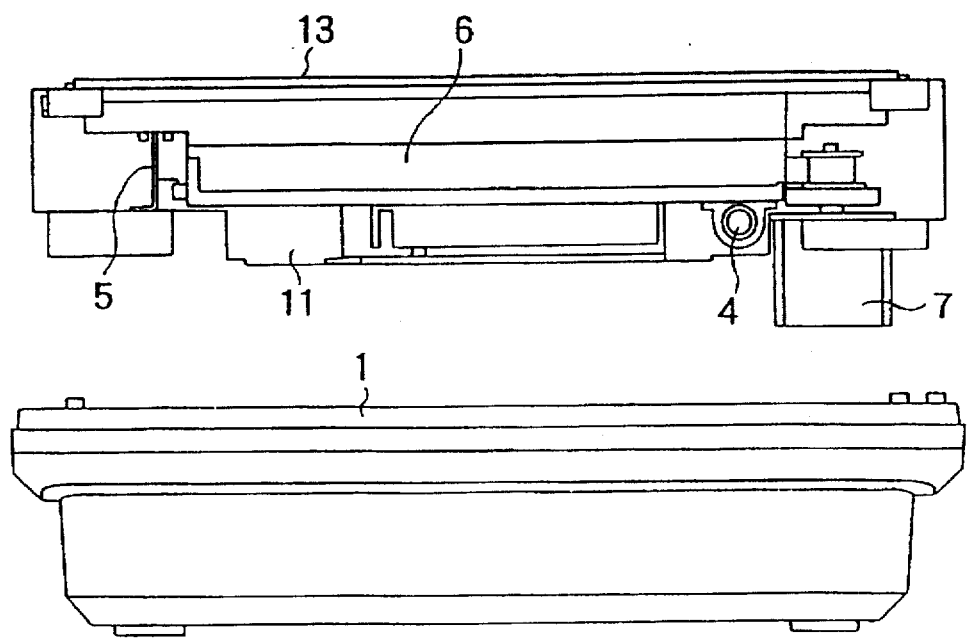
FIG. 8 is a schematic front view of the image reading device according to the first embodiment with the lower part of the chassis and the frame removed.

FIG. 1 to FIG. 9 relate to an image reading device of a first embodiment of the present invention. FIG. 1 is a plan view showing the essential features of the image reading device with the upper part of the chassis removed, FIG. 2 is a plan view showing the essential features of the image reacting device with the lower part of the chassis removed, FIG. 3 is a perspective view showing the essential features of a holding mechanism of the reading unit of the image reading device, FIG. 4 is a plan view showing how the reading unit of the image reading device is held, FIGS. 5A and 5B are sections showing the essential features of the holding mechanism of the reading unit of the image reading device, FIG. 6 is a perspective view showing the rear of the image reading device, FIG. 7 is a front view of the image reading device with the lower part of the chassis removed, FIG. 8 is a front view of the image reading device with the lower part of the chassis and the frame removed, FIG. 9A is a plan view of a slit in the reading unit, and FIG. 9B is a front view of this slit (when viewed along the line I—I in FIG. 1).

In the figures, A indicates the front side of the image reading device, and B indicates the rear side of the image reading device. In FIG. 2, the center part of a frame is partially cut away.

Figure 9A:
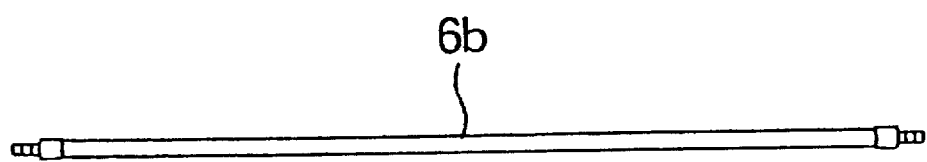
FIG. 9A is a plan view of a slit in the reading unit.
Figure 9B:
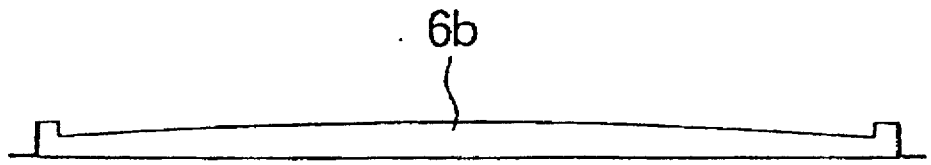
FIG. 9B is a front view of the slit (when viewed along the line I—I in FIG. 1).

As shown in the figures, the image reading device of the first embodiment comprises a chassis 1, a frame 2 fixed to the chassis 1, a stay 3 fixed to the frame 2 by means of fixing screws 3a (shown only in FIG. 3), a guide shaft 4 fixed to the frame 2, a rail 5 fixed to the frame 2, and a reading unit 6 supported by the guide shaft 4 and the rail 5 such that it is free to slide toward the front and rear of the image reading device (direction A or B). A pair of light; sources 6a for illuminating a text, a slit 6b for transmitting reflected light from the text, optical parts for reading a text image such as mirrors and a lens tube (not; shown in FIG. 1 to FIG. 9B) and a line sensor (not shown in FIG. 1 to FIG. 9B) are mounted on the reading unit 6. The optical parts and the line sensor are the same as those, for example, shown in FIG. 17 and FIG. 18 regarding the fourth embodiment described below. The slit 6b of the reading unit 6 is thick in the center and becomes thinner toward its ends, as shown in FIG. 9B. The center of the slit 6b therefore transmits less light than the ends, so that the slit 6b has a light amount regulating function. This is in order to render the light distribution of the light sources 6a, which is more intense in the center and weaker toward the edges, uniform. A plurality of bosses 3b are provided to attach other devices such as a reading device for transparent text or the like. This prevents the load due to the device attached from acting directly on the frame 2, and makes distortion of the frame 2 less likely to occur.

The image reading device of the first embodiment further comprises a motor 7 provided with a drive gear 7a on a rotator shaft, a drive pulley 8 rotated by the drive force of the drive gear 7a, a driven pulley 9, and a timing belt 10 wound around the drive pulley 8 and driven pulley 9 which is also fixed to the reading unit 6. The reading unit 6 is therefore moved in the direction A or B by the timing belt 10 which moves due to the rotation of the motor 7. In the figures, 11 indicates a flat cable. 12, indicates a signal relay board connected to the image reading unit 6 by the flat cable 11, and 13 indicates a glass plate for mounting a text 13.

When it is desired to read a text image on the glass plate 13 by means of the image reading device, the text is illuminated by the light sources 6a, the light reflected from the text enters the interior of the reading unit 6 via the slit 6b, and is then made to form an image on the image-forming surface of the line sensor via the optical parts consisting of the reflecting mirror and lenses. The image signal output by the line sensor is transmitted to the signal relay board 12 and a signal processing board (not shown) via the flat cable 11 further, and after signal processing has been performed, the signal is supplied directly from digital or analog output terminals 1a shown in FIG. 6 to a personal computer, printer, display or other device.

The image reading device of the first embodiment further comprises a holding mechanism to fix the reading unit 6 so that it does not move along the guide shaft 4 when the device is transported. This holding mechanism comprises a screwhole 6c formed in the rear surface of the reading unit 6, a throughhole 2a formed in the frame 2 coaxially with the screwhole 6c of the reading unit 6, a throughhole 3b formed in the stay 3 coaxially with the screwhole 6a, of the reading unit 6 and the throughhole 2a of the frame 2, an elastic member 14 having a throughhole 14a, and a holding member 15 with a large diameter grip 15a and a small diameter screw 15b.

A groove 14b in the elastic member 14 engages with the throughhole 2a of the frame 2. When the image reading device is transported, the screw 15b of the holding member 15 passes through the throughhole 3b of the stay 3 and the throughhole 14a of the elastic member 14 as shown in FIG. 5A, and the grip 15a is then rotated manually so that the member 15 engages with the screw hole 6c of the reading unit 6. The reading unit 6 is thereby fixed to the frame 2 in contact with the elastic member 14, as shown in FIG. 4 or FIG. 5B.

The elastic member 14 is preferably made of rubber, but it may also consist of a resin or metal spring or other such part provided that this body has a shock absorbing function which does not easily transmit external vibrations, to which the device may be subjected, to the reading unit 6.

Moreover, the screwhole 6c of the reading unit 6 is preferably formed on or in the vicinity of a line passing through the center of gravity of the reading unit 6. The reading unit 8 is thereby fixed close to its center of gravity so that bending moments do not affect the holding member 15, and damage to the reading unit 6 and holding member 15 is prevented.

In addition, the motor 7 and circuit boards such as the signal relay board 12 are preferably installed at positions on the opposite side of the image reading device (at the front in the first embodiment) to the position at which the reading unit 6 is fixed (at the rear in the first embodiment), so that unbalanced loads are prevented.

When transport of the image reading device is completed and it is desired to use the image reading device, the grip 15a of the holding member 15 is rotated manually so as to release the screw 15b from the screwhole 6c of the reading unit 6, and the holding unit 15 may then be removed. As described above, according to the image reading device of the first embodiment, the grip 15a of the holding member 15 is provided so that a screwdriver or other tool is not required when attaching or removing the holding member 15, and the effort required by the operator to perform these operations may be reduced. Moreover, when the image reading device is transported, the reading unit 6 is fixed by the holding member 15 in contact with the elastic member 14 which engages with the frame 2. External shocks to which the device may be subjected during transport therefore do not easily affect the reading unit 6, and damage to or distortion of the structure of the reading unit 6 is prevented.

Second Embodiment

Figure 10:
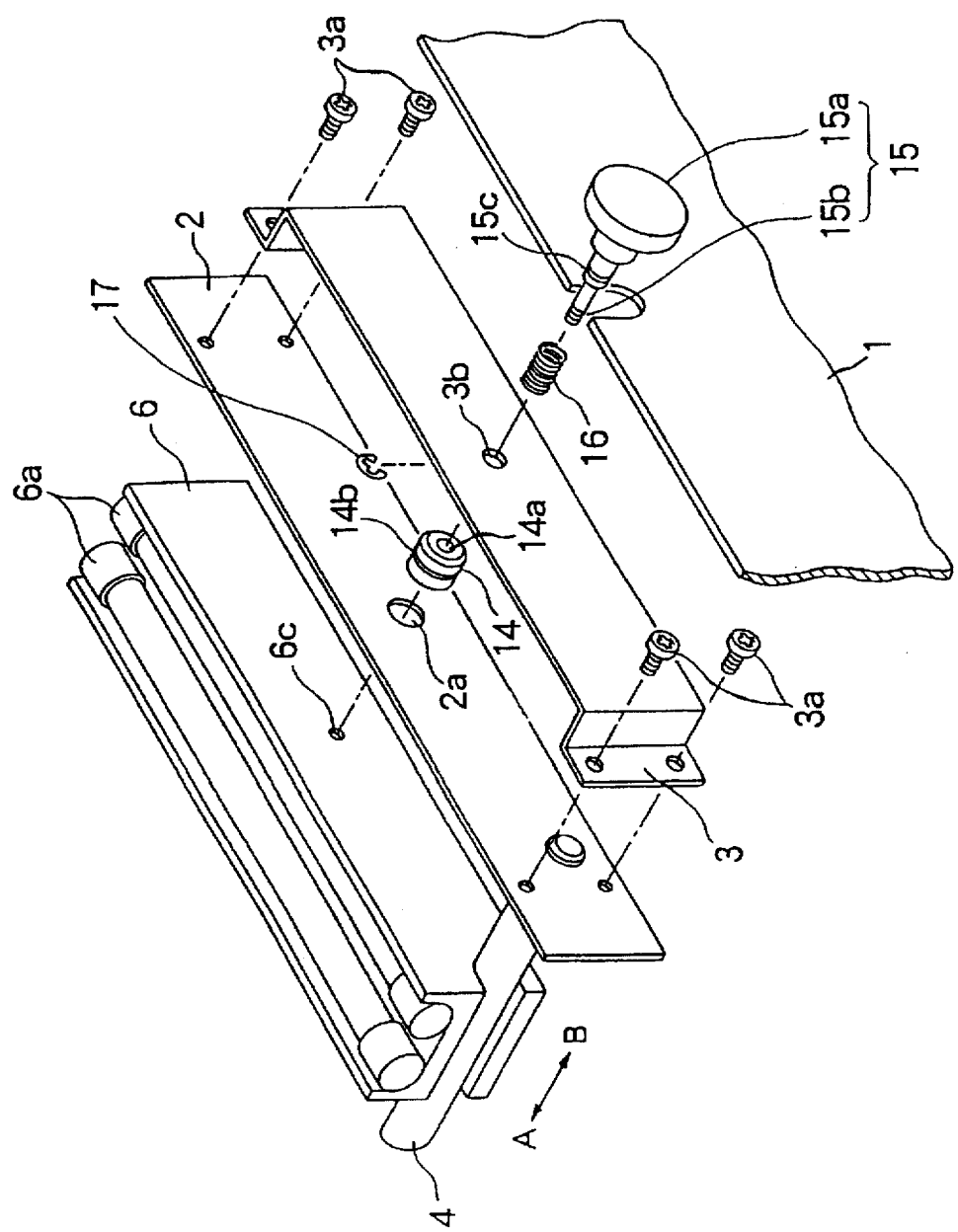
FIG. 10 is a perspective view schematically showing the essential features of a holding mechanism of a reading unit of an image reading device according to a second embodiment of the present invention.
Figure 11A:
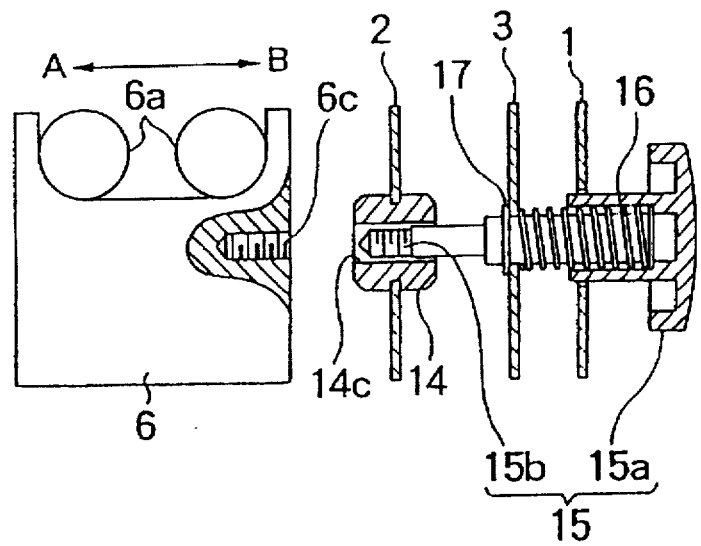
FIGS. 11A and 11B are sections showing the essential features of the holding mechanism of the reading unit of the image reading device according to the second embodiment.
Figure 11B:
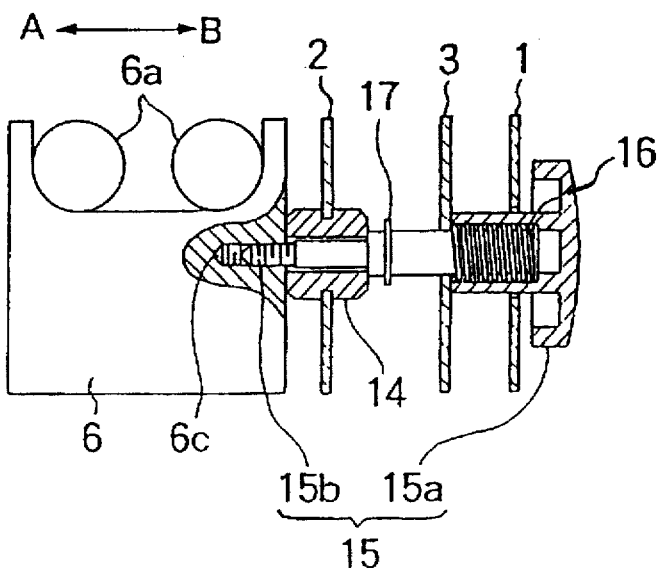

FIG. 10 and FIG. 11 relate to an image reading device of a second embodiment of the present invention. FIG. 10 is an exploded perspective view showing the essential features of a holding mechanism of a reading unit, arid FIGS. 11A and 11B are sections showing the essential features of the holding mechanism of the reading unit.

In FIG. 10 and FIG. 11, identical numbers are assigned to parts which are identical to or correspond to parts of the construction of the first embodiment shown in FIG. 1 to FIG. 9, and their description is therefore omitted.

As shown in FIG. 10 arid FIG. 11, in the image reading device of the second embodiment, a compression spring 16 which pushes the holding member 15 toward the outside of the image reading device, is provided on the outer side of the stay 3. A groove 15c is formed iii the holding member 15, a clip 17 being fixed on the groove 15c on the inner side of the stay 3. The compression spring 16 may conveniently be a coil spring, however a flat spring or other member may be used provided it pushes the holding member 15 toward the outside of the device. The clip 17 may conveniently be an E-shaped ring as shown in FIG. 10, however a part having a different shape may be used provided it fixes the holding member 15 and prevents it from being pulled out. The remaining construction is identical to that of the first embodiment In the image reading device according to the second embodiment, when the screwhole 6c of the reading unit 6 and the screw 15b of the holding member 15 are disengaged, the holding member 15 is held in the stay 3 by means of the compression spring 16 which pushes the member 15 toward the outside of the image reading device and by the clip 17 in contact with the inner surface of the stay 3, as shown in FIG. 11A. The image reading device may therefore be used with the holding member 15 in the position shown in FIG. 11A. As there is no need to remove and store the holding member 15, the operator has less work to perform. Dust and dirt are also prevented from entering the image reading device via the throughholes 3b and 2a.

It is desirable that the clip 17 is attached in such a position that, when the screw 15b of the holding member 15 is disengaged from the screwhole 6c of the reading unit 6 and the member 15 is held by the stay 3 as shown in FIG. 11A, the end of the screw 15b of the member 15 does not project further inside the device than the inner surface 14c of the elastic member 14. The elastic member 14 can then absorb any shock caused by the reading unit 6 impacting directly on the frame 2 or the holding member 15 even if the image reading device is handled roughly.

Third Embodiment

Figure 13A:
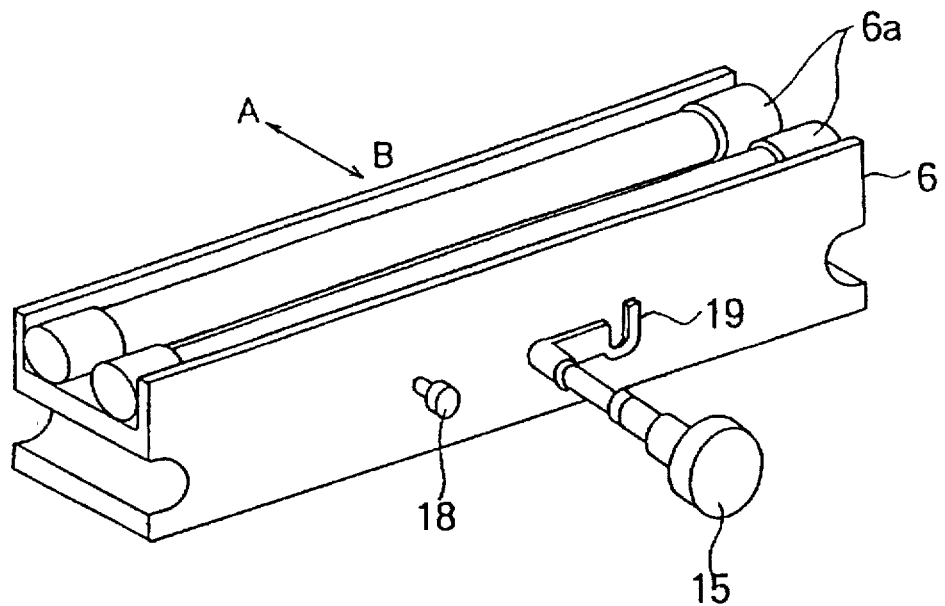
FIGS. 13A and 13B are perspective views for the purpose of explaining the action of the holding mechanism of the reading unit of the image reading device according to the third embodiment.
Figure 13B:
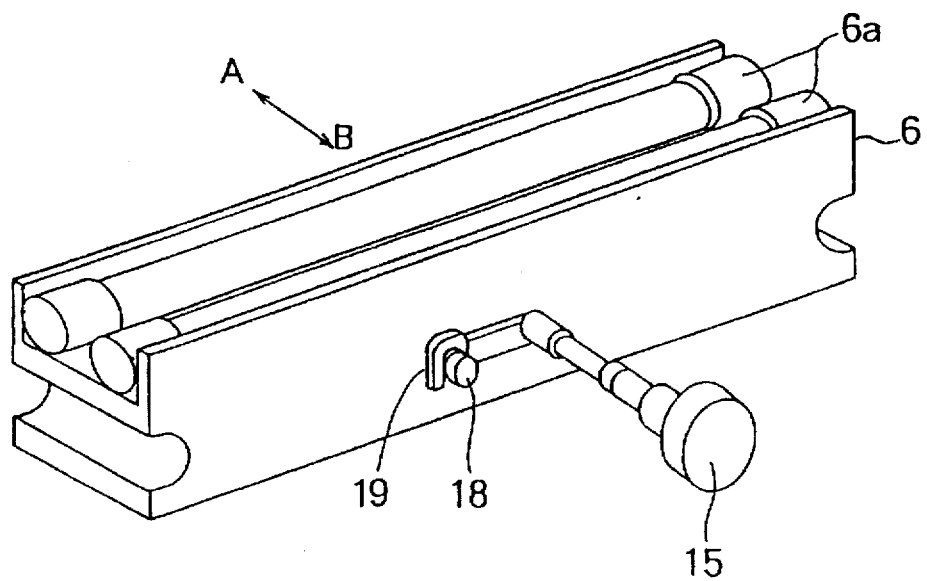

FIG. 12 and FIG. 13 relate to an image reading device of a third embodiment of the present invention. FIG. 12 is an exploded view in perspective schematically showing the essential features of a holding mechanism of a reading unit. Further, FIGS. 13A and 13B are sections for the purpose of explaining the action of the holding mechanism of the reading unit.

In FIG. 12 and FIG. 13, identical numbers are assigned to parts which are identical to or correspond to parts of the construction of the second embodiment shown in FIG. 10 and FIG. 11, and their description is therefore omitted.

As shown in FIG. 12 and FIG. 13, in the image reading device according to the third embodiment, a hook 18 is provided at the end of the holding member 15, and a projection 19 is provided on the rear surface of the image reading unit 6 in such a position that it engages with the hook 18 when the latter is rotated. Apart from these provisions, and the fact that the elastic member 14 is not provided, the construction of the image reading device of the third embodiment is identical to that of the second embodiment.

In the image reading device according to the third embodiment, when the image reading device is transported, the large diameter grip 15a of the holding member 15 which passes through the throughhole 3b of the stay 3 and the throughhole 2b of the frame 2 is rotated. This rotates the hook 18 so that it engages with the projection 19 so as to fix the reading unit 6, illustrated by a transition from the state shown in FIG. 13A to the state shown in FIG. 13B. When the image reading device is used, the grip 15a of the holding member 15 is rotated in the reverse sense so that the hook 18 disengages from the projection 19, illustrated by a transition from the state shown in FIG. 13B to the state shown in FIG. 13A.

In the image reading device according to the third embodiment, the large diameter grip 15a of the holding member 15 is provided so that a screwdriver or other tool is not required when attaching or removing the holding member 15, and the effort required by the operator to perform these operations may be reduced. Further, when the hook 18 and the projection 19 are disengaged, the holding member 15 is held against the stay 3 by means or the compression spring 16 which pushes the holding member 15 toward the outside of the device, and by the clip 17 in contact with the inner surface of the stay 3. When the image reading device is used, therefore, there is no need to remove and store the holding member 15, the operator has less work to perform, and dust and dirt are prevented from entering the interior of the device via the throughholes 3b and 2a.

Fourth Embodiment

Figure 14:
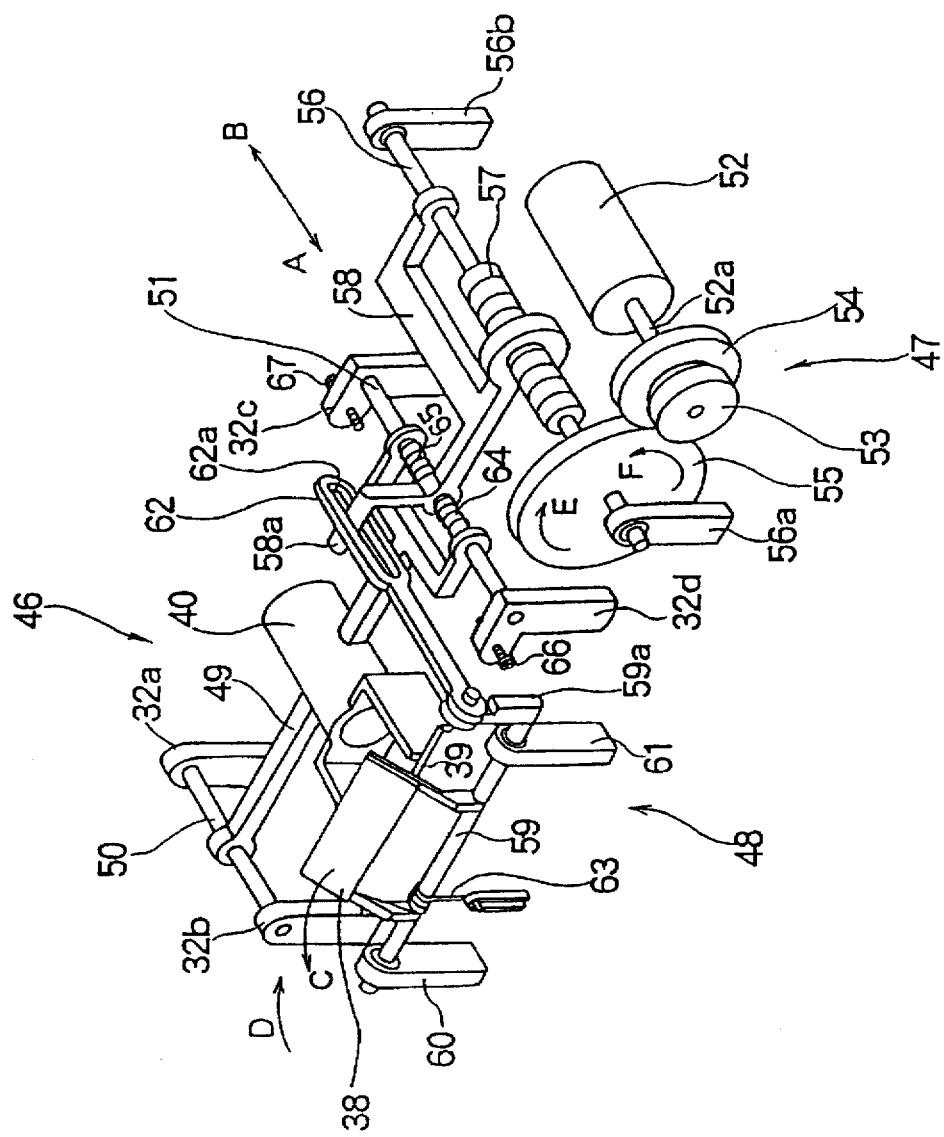
FIG. 14 to FIG. 16 are perspective views schematically showing the internal structure of a reading unit in an image reading device according to a fourth embodiment of the present invention.
Figure 15:
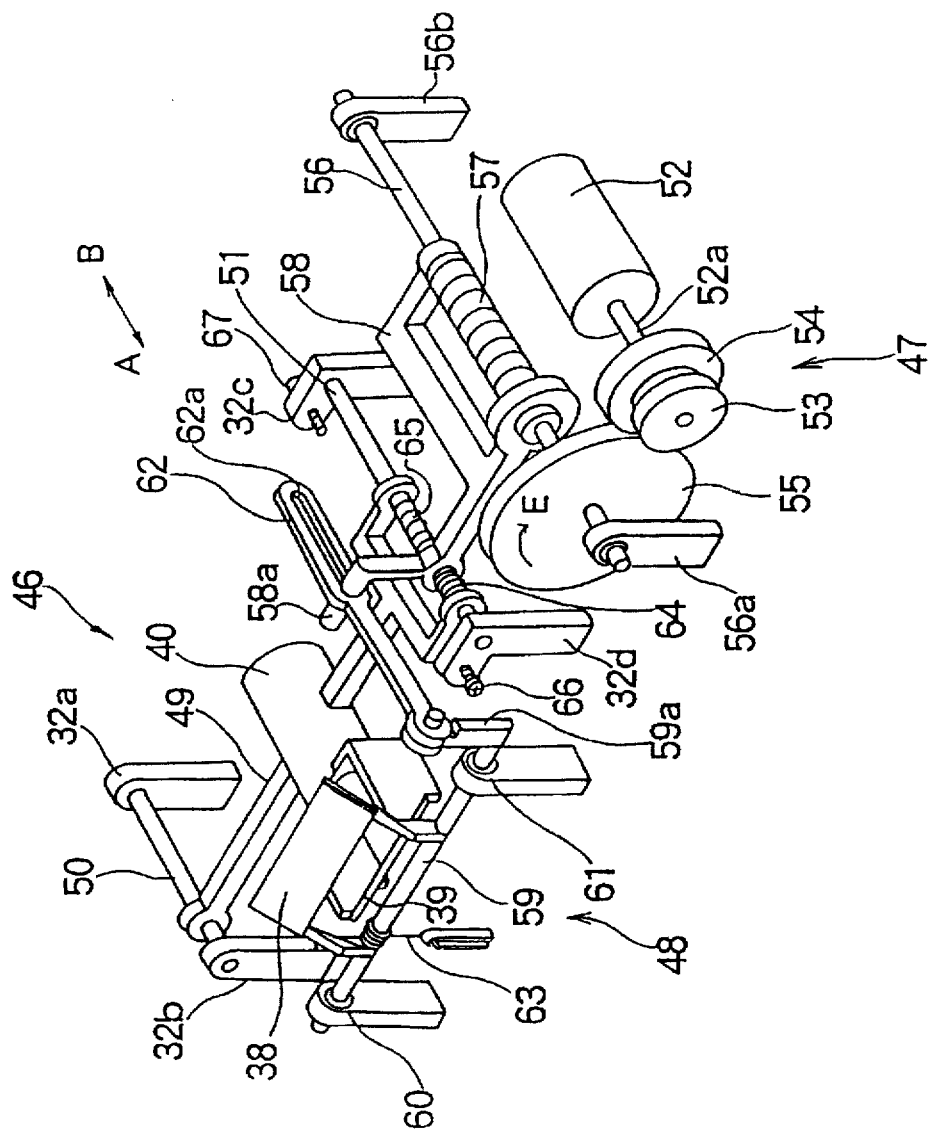
Figure 16:
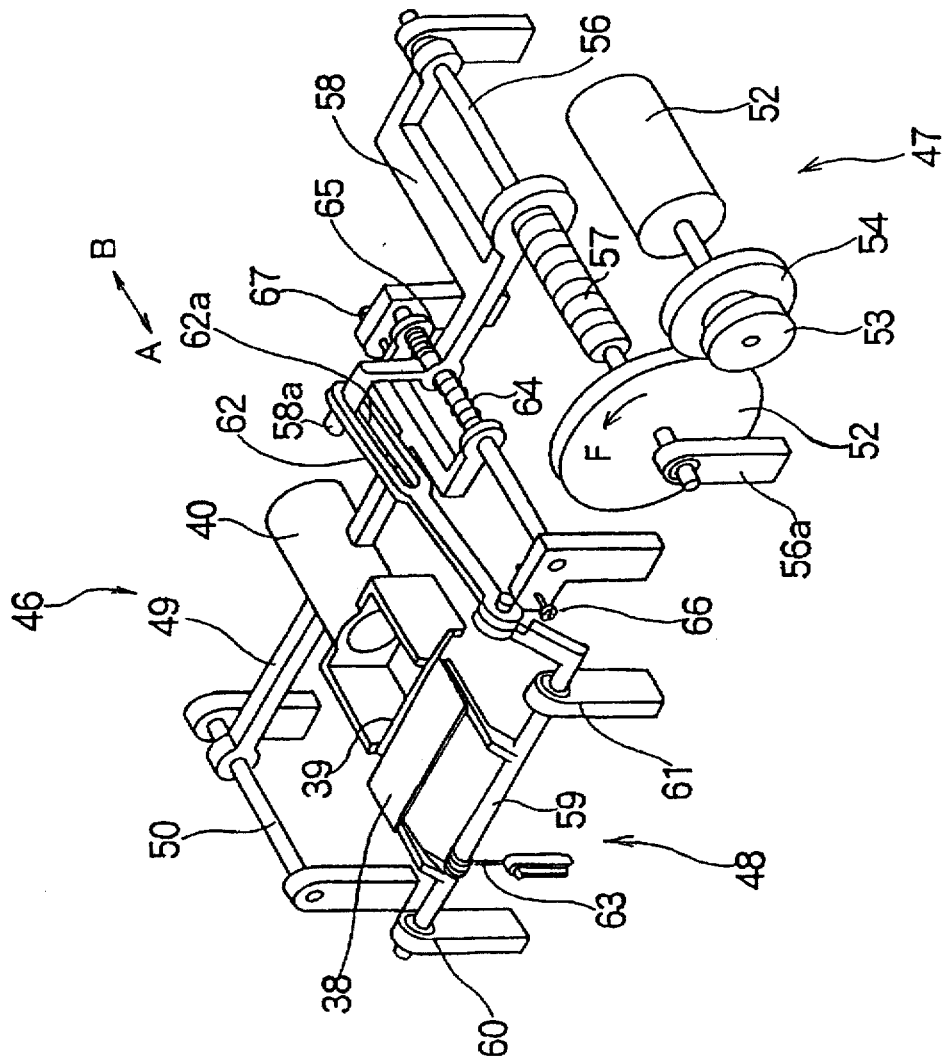
Figure 17:
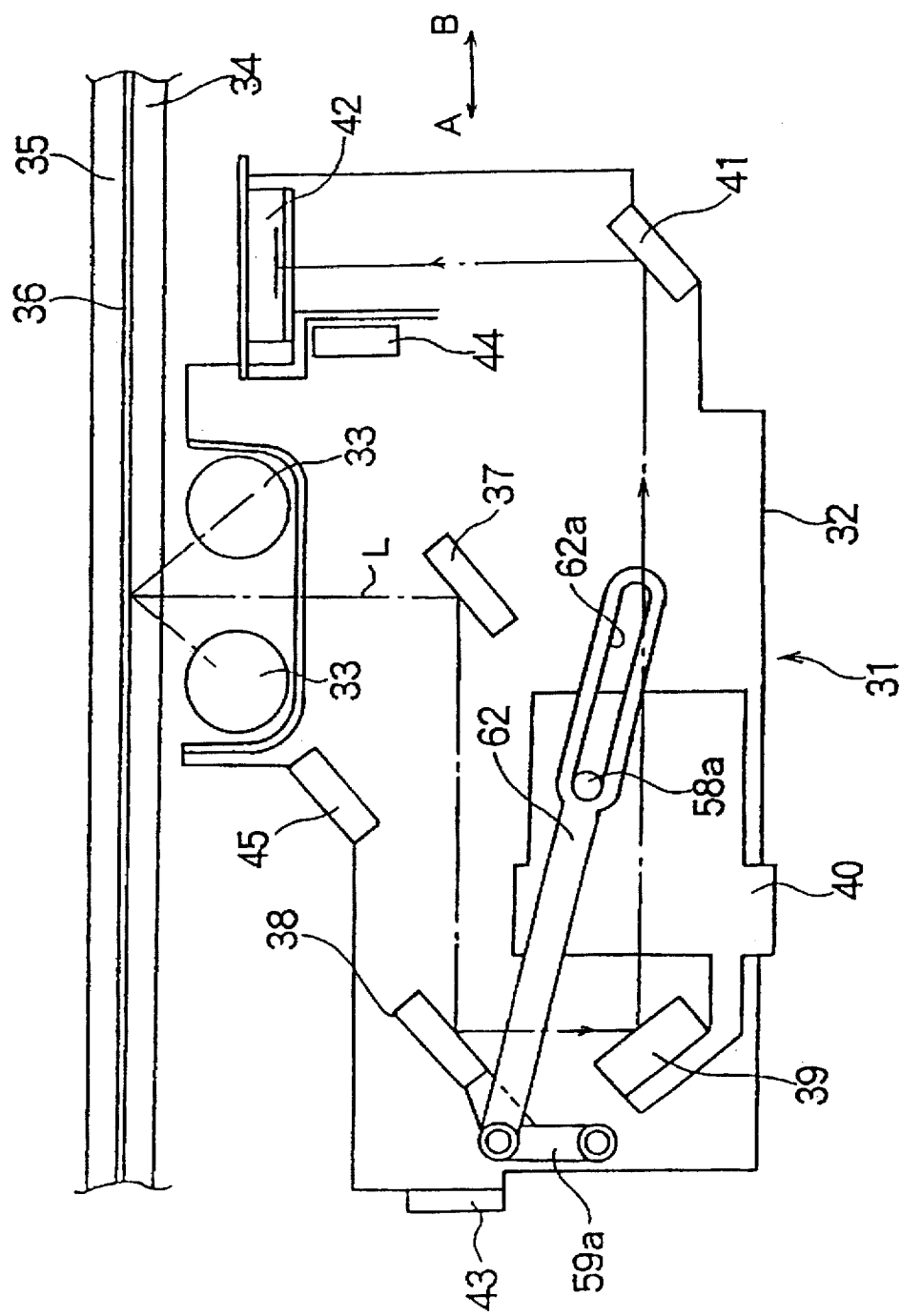
FIG. 17 is a section schematically showing how the optical system in the reading unit is arranged (corresponding to FIG. 15).
Figure 18:
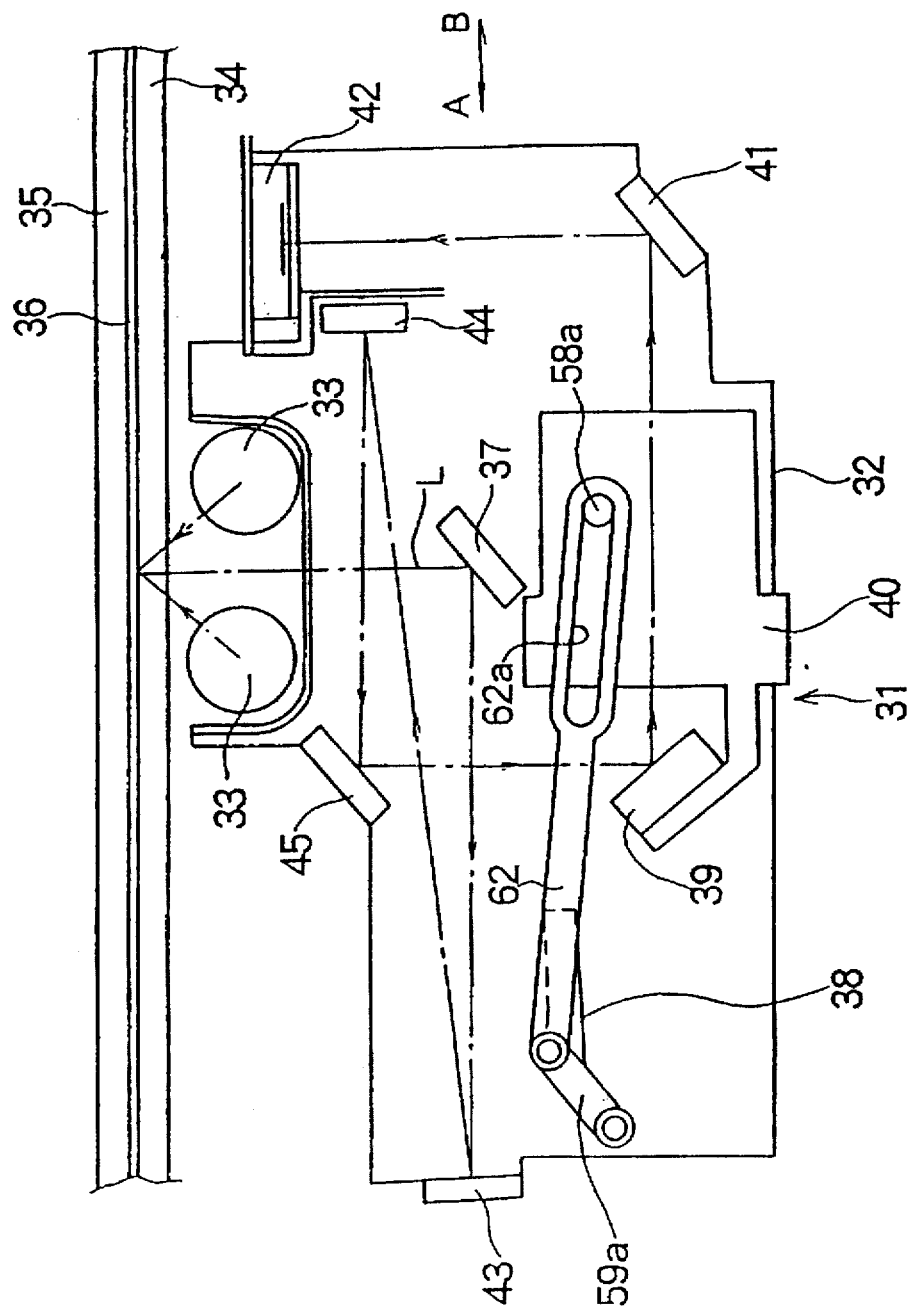
FIG. 18 is a section schematically showing how the optical system in the reading unit is arranged (corresponding to FIG. 18).

FIG. 14 to FIG. 16 are perspective views schematically showing the internal structure of a reading unit in an image reading device according to a fourth embodiment of the present invention. FIG. 17 arid FIG. 18 are perspective views showing the state of an optical system in the image reading unit. FIG. 17 corresponds to the state shown in FIG. 15, and FIG. 18 corresponds to the state shown in FIG. 16.

As shown in FIG. 17 and FIG. 18, an image reading unit 31 in the image reading device according to the fourth embodiment comprises a frame 32 to prevent intrusion of stray light from outside the device, and light sources, 33 for illuminating a text provided in the upper part of the frame 32. The frame 32 contains a fixed mirror 37 which reflects light L from a text 36 mounted on a glass plate 34 and clamped from above by a cover 35, a movable mirror 38, a lens tube 40 consisting of a series of lenses, a mirror 39 fixed to the lens tube 40, a fixed mirror 41 fixed to the frame 32, and a line sensor 42 fixed to the frame 32. Fixed mirrors 43, 44, 45 having predetermined orientations are also provided at predetermined positions inside the frame 32.

In the state shown in FIG. 17, the lens tube 40 is in its normal position (first position) wherein the optical path length from the lens tube 40 to the line sensor 42 is long, and the movable mirror 38 is in an inclined position (third position) wherein it guides light L reflected by the fixed mirror 37 to the mirror 39.

In the state shown in FIG. 18, on the other hand, the lens tube 40 is in a reducing position (second position) wherein the optical path length from the lens tube 40 to the line sensor 42 is short, and the movable mirror 38 is in a horizontal position (fourth position) not on the optical path of the light reflected from the fixed mirror 37. Light reflected from the fixed mirror 37 is then reflected by the fixed mirrors 43, 44, 45 to the fixed mirror 39 so as to lengthen the optical path from the text 36 to the lens tube 40.

Further, as shown in FIG. 14 to FIG. 16, the reading unit contains a guide mechanism 46 which supports the lens tube 40 in the reading unit such that the tube is free to move in the direction A or B; a displacing mechanism 47 which moves the lens tube 40 from its normal position shown in FIG. 17 to its reducing position shown in FIG. 18 and vice versa, and a mechanism 48 which moves in synchronism with the displacing mechanism 47 when the latter displaces the lens tube 40, adjusts the movable mirror 38 to an inclined position wherein the lens tube 40 is in its normal position shown in FIG. 17, and adjusts the movable mirror 38 to a horizontal position when the lens tube 40 is in its reducing position shown in FIG. 18.

The guide mechanism 46 comprises a supporting member 49 which supports the lens tube 40, and guide shafts 50, 51 fixed to the frame 32 (shown in FIG. 17 and FIG. 18) via supports 32a, 32b, 32c, 32d which support the supporting member 49 such that it is free to slide in the directions A and B.

The displacing mechanism 47 comprises a motor 52, a torque limiter 53 provided on the rotation axle 52a of the motor 52, a drive gear 54 provided on the rotation axle 52a of the motor 52 via the torque limiter 53, and a driven gear 55 which engages with the drive gear 54. The displacing mechanism 47 further comprises a shaft 56 supported such that it is free to turn on axle bearings 56a, 56b which are fixed to the frame 32, the shaft 56 carrying the driven gear 55, and a Feed screw 57 provided on the shaft 56 coaxially with the driven gear 55. In addition, the displacing mechanism 47 comprises a moving member 58 which is free to slide on the guide shaft 51, and which moves linearly in the direction AB, i.e. the longitudinal direction of the guide shafts 50, 51, when the feed screw 57 turns.

The moving mechanism 48 comprises a holding member 59 of the movable mirror 38, and axle bearings 60, 61 fixed to the frame 32 which support the holding member 59 such that it is free to turn. The moving mechanism 48 further comprises a link 62 connected to one end 59a of the holding member 59 such that the link 62 is free to turn. This link 62 has an oblong hole 62a which is longer in the the longitudinal direction of the guide shaft 51 and which engages with one end of the displacing mechanism 47. In addition, the moving mechanism 48 comprises a twisted spring 63 which pushes the movable mirror 38 in a direction C.

The guide shaft 51 is further provided with compression springs 64, 65 which extend or compress in its longitudinal direction (direction AB), these springs 64, 65 transmitting he linear displacement of the moving member 58 to the holding member 49 of the lens tube 40. The supports 32d, 32c of the guide shaft 51 are provided with all adjusting screw 66 which adjusts the normal position of the lens tube 40 shown in FIG. 15 and FIG. 17, and an adjusting screw 67 which adjusts the reducing position of the lens tube 40 shown in FIG. 16 and FIG. 18.

In the image reading device of the fourth embodiment having the above construction, when the motor 52 is operated and the driven gear 55 rotates in a direction E, the feed screw 57 also rotates in the direction E so that the moving member 58 moves in the direction A. Due to the restoring force of the compression spring 64, the lens tube 40 and its holding member 49 also move in the direction A, and the holding member 49 then comes into contact with the end of the adjusting screw 66. The lens tube 40 then stops moving, but the moving member 58 continues moving for some time afterward, and comes to rest when the motor 52 stops. This situation is shown in FIG. 15 and FIG. 17. In this state, the lens tube 40 can be moved so as to adjust the focus by turning the adjusting screw 66. The end 58a of the moving member 58 also comes into contact with one end of the oblong hole 62a of the link 62, and although the moving member 58 cannot move any further, the torque limiter 53 rotates so that an excessive load does not act on the drive gear 54, driven gear 55, feed screw 57, moving member 58, holding member 59 of the mirror 38 and link 62, thereby preventing damage to the construction.

Next, when the motor 52 is rotated in the reverse direction and the driven gear 55 rotates in a direction F, the feed screw 57 also rotates in the direction F so that the moving member 58 moves in the direction B. Due to the restoring force of the compression spring 65, the lens tube 40 and its holding member 49 also move in the direction B, and the holding member 49 then comes into contact with the end of the adjusting screw 67. The lens tube 40 then stops moving, but the moving member 58 continues moving for some time afterward. After the end 58a of the moving member 58 has pulled the link 62 in the direction B so as to move the movable mirror 88 in the direction D, the motor 52 stops and the moving member 58 stops moving at the same time. This situation is shown in FIG. 16 and FIG. 18. In this state, the lens tube 40 can be moved so as to adjust the focus by turning the adjusting screw 67. The end 58a of the moving member 58 also comes into contact with one end of the oblong hole 62a of the link 62, and although the moving member 58 can not move any further, the torque limiter 53 rotates so that an excessive load does not act on the drive gear 54, driven gear 55, feed screw 57, moving member 58, holding member 59 of the mirror 39 and link 62, thereby preventing damage to the construction.

According to the device of the fourth embodiment, the lens tube 40 moves along the guide shafts 50, 51, and the movable mirror 38 alternates between predetermined positions due to the mechanism 48. Optical parts such as mirrors and lenses can thus be moved with high precision, and distortion of the image read by the line sensor is consequently prevented.

Fifth Embodiment

Figure 19:
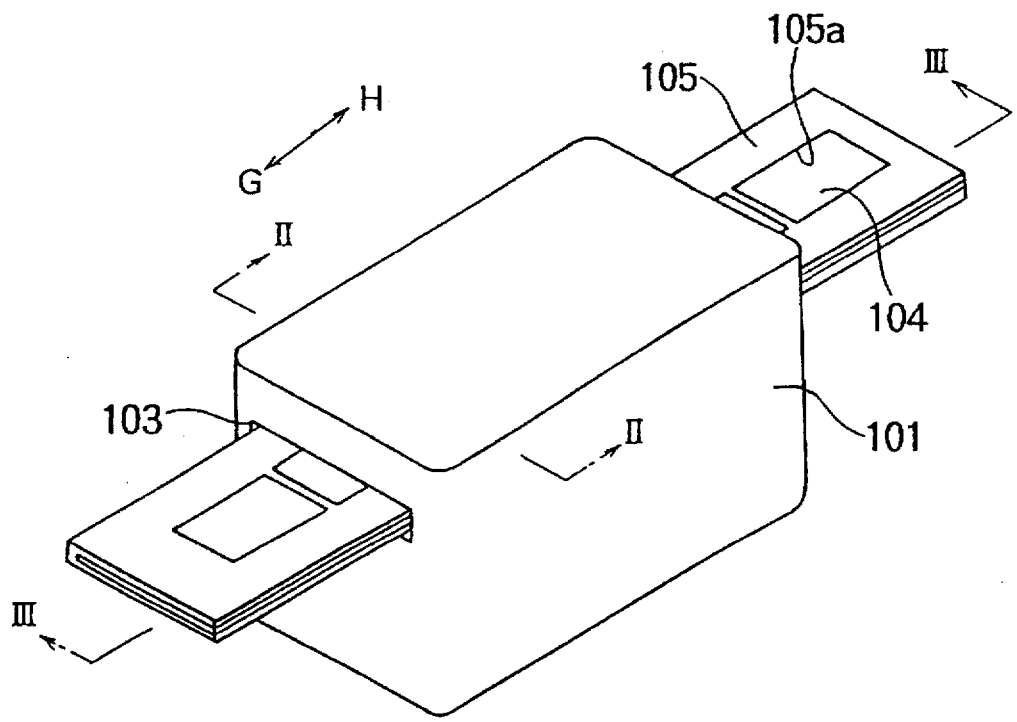
FIG. 19 is a perspective view of all image reading device according to a fifth embodiment of the present invention.
Figure 20:
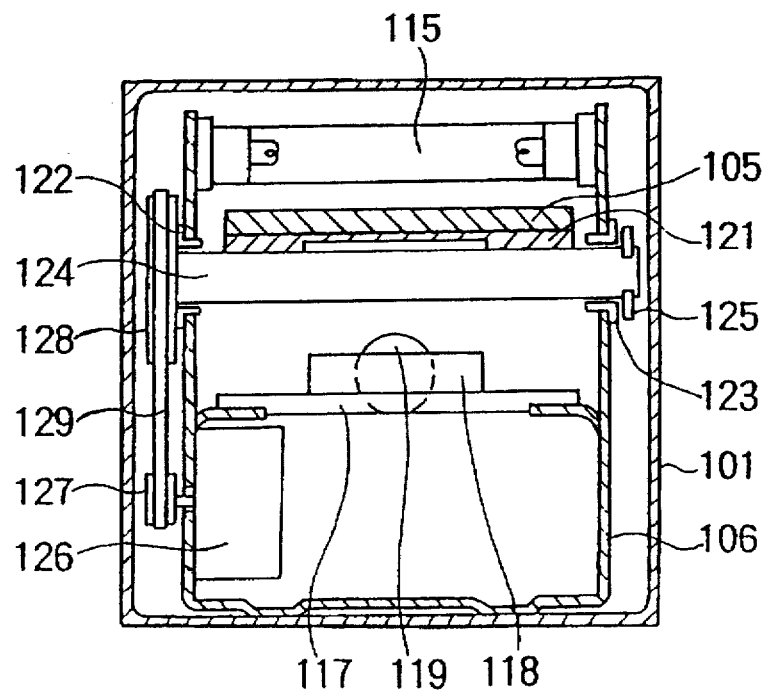
FIG. 20 is a schematic view of a section along the line II—II in FIG. 19 of the image reading device according to the fifth embodiment.
Figure 21:
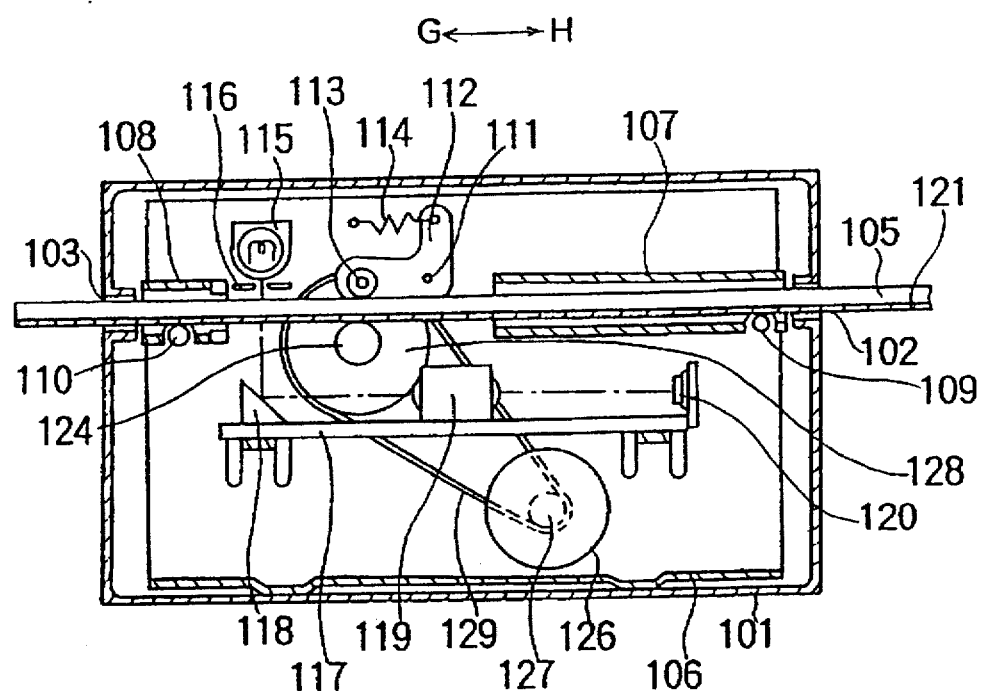
FIG. 21 is a schematic view of a section along the line III—III in FIG. 19 of the image reading device according to the fifth embodiment.
Figure 22:
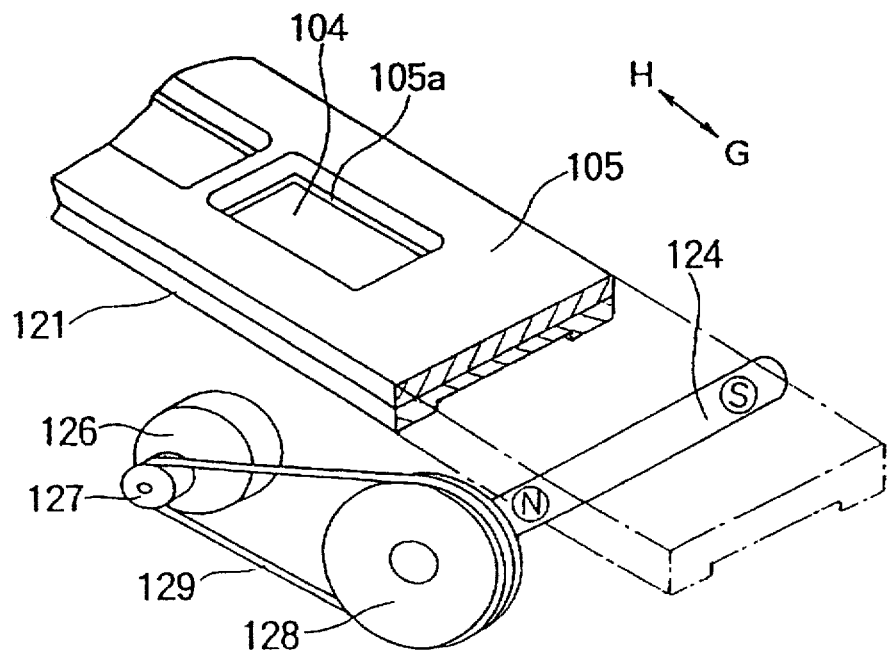
FIG. 22 is a perspective view schematically showing an enlargement of a displacing mechanism which moves a film holder according to the fifth embodiment.
Figure 23:
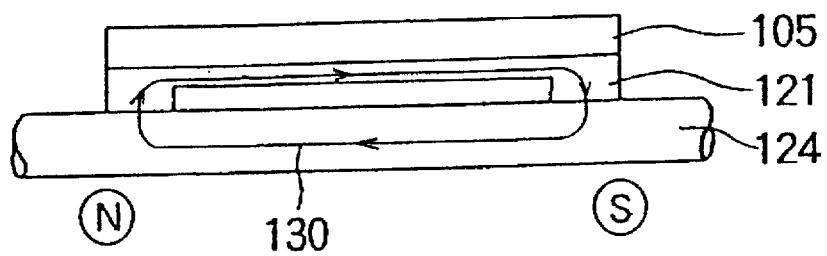
FIG. 23 is a diagram showing the principle whereby the film holder of the fifth embodiment is magnetically attracted.
Figure 24A:
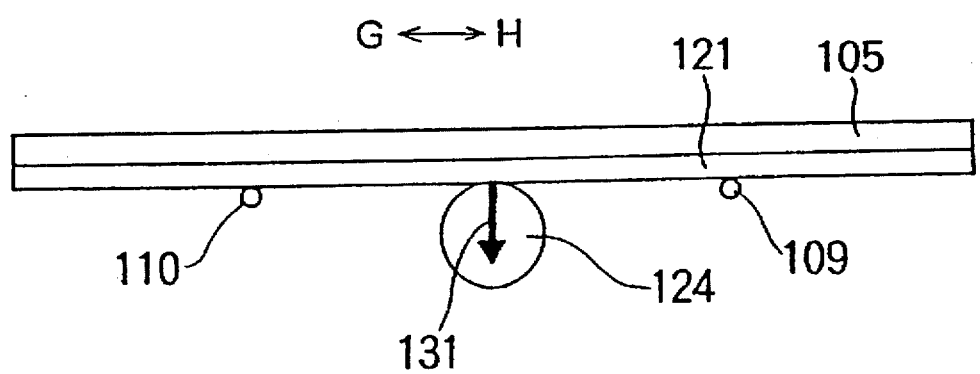
FIGS. 24A and 24B are diagrams showing the magnetic attraction force and frictional force acting on the film holder according to the fifth embodiment.
Figure 24B:
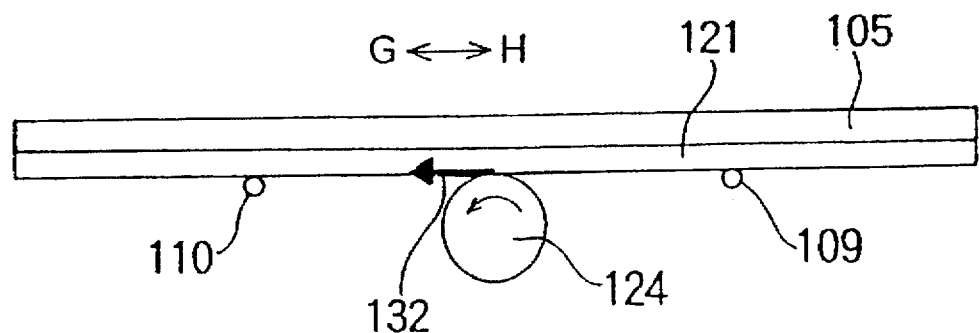
Figure 25:
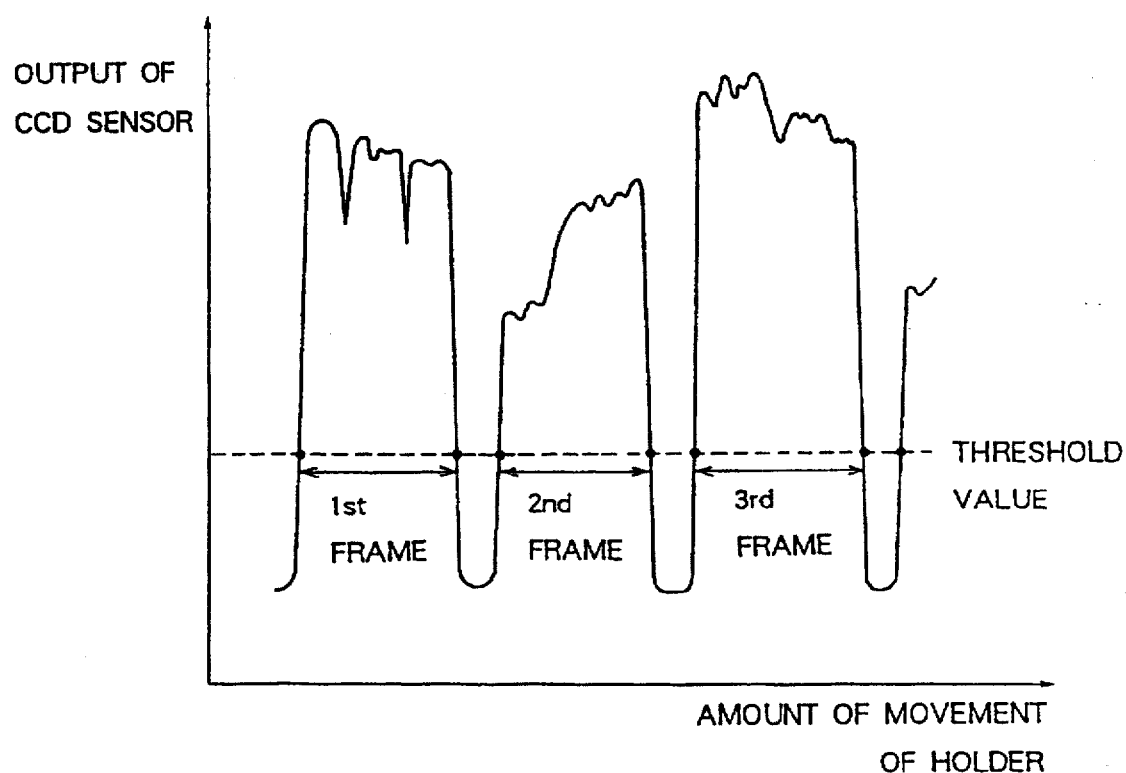
FIG. 25 is a diagram showing the output of a line sensor according to the fifth embodiment.

FIG. 19 to FIG. 25 relate to an image reading device according to a fifth embodiment of the present invention. FIG. 19 is an external view in perspective of the image reading device, FIG. 20 is a view in section along the line II—II in FIG. 19 of the image reading device, FIG. 21 is a view in section along the line III—III in FIG. 19 of the image reading device, FIG. 22 is a view in perspective showing an enlargement of a displacing mechanism which moves a film holder, FIG. 23 is a diagram showing the principle whereby the film holder is attracted magnetically, FIGS. 24A and 24B are diagrams showing the magnetic attraction force and frictional force acting on the film holder, and FIG. 25 is a diagram showing the output of a line sensor.

As shown in FIG. 19 to FIG. 21, in the image reading device according to the fifth embodiment, a chassis 101 is provided with a film holder inlet 102 and a film holder outlet 103, a film holder 105 which grips a film 104 being inserted in the inlet 102. This film holder 105 is provided with a plurality of windows 105a which are formed so as to coincide with the position and size of image frames on the film 104, the film 104 being arranged so that one image frame coincides with a window 105a in the holder 105.

As shown in FIG. 21, in the image reading device according to the fifth embodiment, there are provided a frame 106 Fixed to the chassis 101, guides 107, 108 fixed to the frame 106 for guiding the film holder 105, and guide rollers 109, 110 supported in the frame 106 such that they are Free to turn.

Additionally, as shown in FIG. 21, in the image reading device according to the fifth embodiment, there are provided a pressure arm 112 attached to the frame 106 which turns about an axis 111, a pressure roller 113 attached to one end of the pressure arm 112 such that it is free to turn, and a spring 114 whereof one end is fixed to the frame 106 and the other end is fixed to the pressure arm 112. When the film holder 105 is inserted from the film holder inlet 102 guided by the guide roller 109 and guide 107, the upper surface of the holder 105 is pushed down by the pressure roller 113.

As shown in FIG. 20 or FIG. 21, in the image reading device according to the fifth embodiment, there are further provided a lamp unit 115 for illuminating the film, a slit 116, an optical system base 117 fixed to the frame 106, a reflecting mirror 118 on the optical system base 117, a lens unit 119 on the optical system base 117, and a CCD line sensor 120.

As shown in FIG. 22, a rail 121 consisting of a magnetic material such as iron or the like and having a U-shaped cross-section is attached to the underside of the film holder 105 used in the image reading device according to the fifth embodiment. This image reading device further comprises a roller-shaped Film holder drive member 124 at a position wherein it comes into contact with the rail 121 of the holder 105 inserted in the chassis 101 from the inlet 102. This drive member 124 consists of a cylindrical magnet supported in the frame 106 via axle bearings 122, 123 such that it is free to rotate, and magnetized such that there are magnetic poles of different polarity near its two ends. A clip 125 is attached to one end of the film holder drive member 124. The rail 121 of the holder 105 is thinner in its center portion and thicker at its two ends so that it may come into contact with the magnetic poles having different polarity near the two ends of the drive member 124. The drive member 124 and the rail 121 therefore form a magnetic circuit as indicated by the reference numeral 130 in FIG. 23. The drive member 124 exerts a magnetic attractive force on the rail 121 of the holder 105 as shown by the arrow 131 in FIG. 24A, whereas a large frictional force acts between the drive member 124 and the rail 121 as shown by the arrow 132 in FIG. 2413. Therefore, when the drive member 124 is rotated) the holder 105 moves in the direction of the contact line (direction G) of the drive member 124.

The image reading device of the fifth embodiment further comprises a stepping motor 126, a drive pulley 127 attached to the rotation axle of the stepping motor 126, a driven pulley 128 attached to one end of the drive member 124, and a belt 129 wound around the drive pulley 127 and the driven pulley 128.

The image reading device according to the fifth embodiment and having the above construction, operates in the following manner. As shown in FIG. 21, the film holder 105 inserted in the chassis 101 from the inlet 102 is guided close to the drive member 124 by the film holder guide 107. The pressure roller 113 of the pressure arm 112 is pushed toward the drive member 124 by the spring 114, and the holder 105 inserted in the chassis 101 is pushed by the pressure, roller 113 such that it is in contact with the drive member 124.

The drive member 124 is then rotated so that the holder 105 is displaced. The film 104 is illuminated by the lamp unit 115 and reading continues as the holder 105 is moving. A plurality of frames on the film 104 appearing in the windows 105a of the holder 105 may therefore be read in succession without replacing the film 104 in the holder 105.

When the slit-shaped light beam which has passed through the slit 116 from the lamp unit 115, illuminates the area between one window and an adjacent window of the holder 105 (i.e. when it is scanning the area between frames of the film 104), the light is obstructed by the holder 105 and does not reach the CCD line sensor 120. The output of the CCD line sensor 120 therefore periodically falls below a threshold value, as shown in FIG. 25. If the output of the CCD line sensor 120 is compared with this threshold value, the situation when it exceeds the threshold value may be detected and the number of times that this occurs may be counted. It is then possible to detect which frame on the film 104 is being scanned, and to detect the position of one edge of a window 105a of the holder. Therefore, by monitoring the output of the CCD line sensor 120, it is possible to determine the position on the film 104 presently being scanned, to select frames on the film 104 in the holder 105, and to read them in any desired order.

Sixth Embodiment

Figure 26:
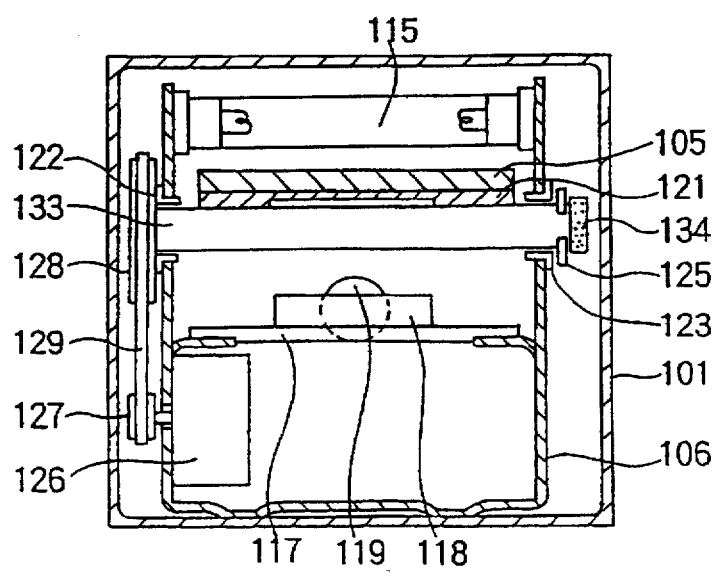
FIG. 26 is a section of an image reading device according to a sixth embodiment of the present invention.
Figure 27:
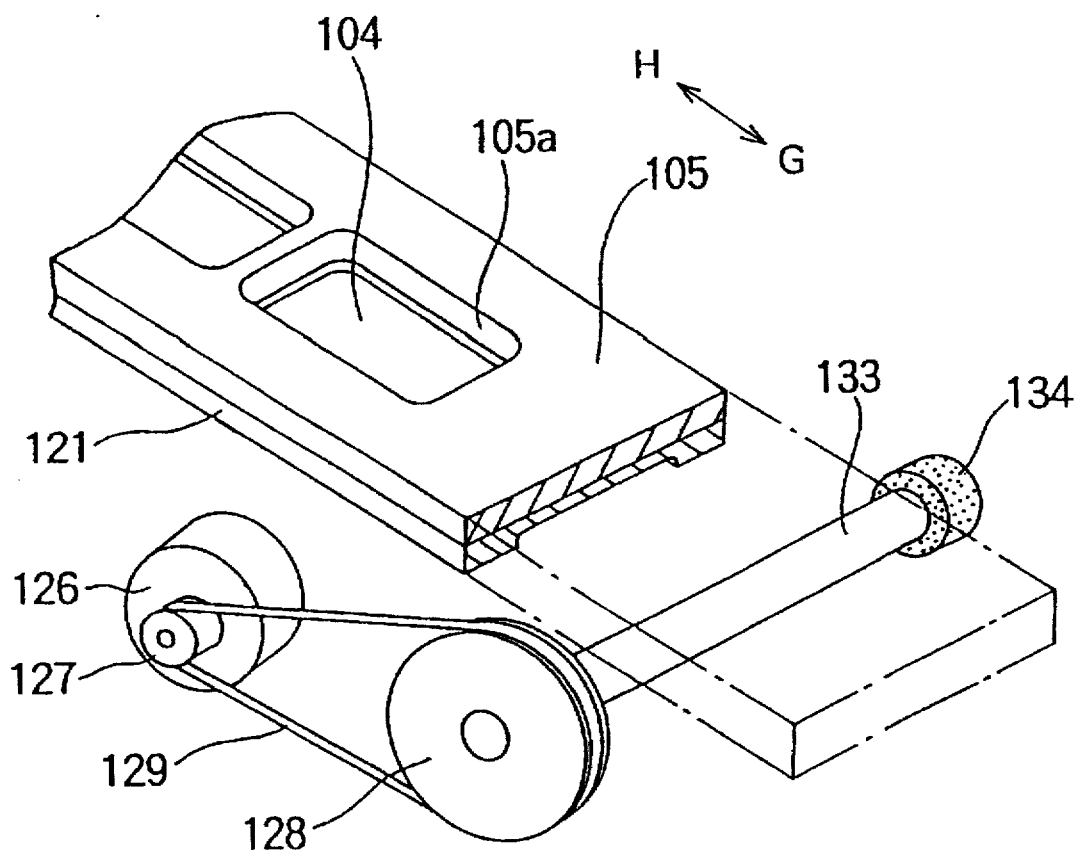
FIG 27 is a perspective view schematically showing an enlargement of a moving mechanism which moves a film holder according to the sixth embodiment.
Figure 28:
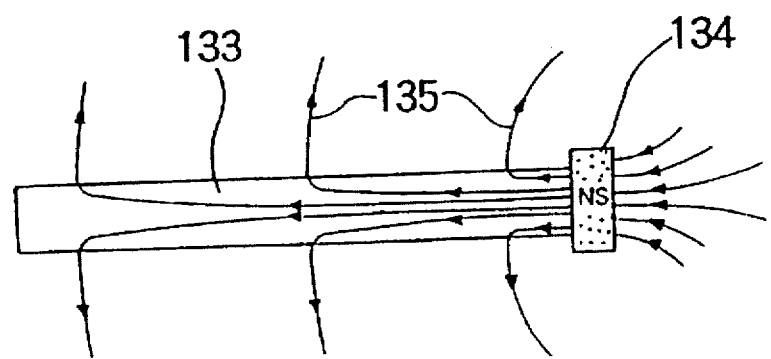
FIG. 28 is a diagram showing the principle whereby the film holder of the sixth embodiment is magnetically attracted.

FIG. 26 to FIG. 28 relate to an image reading device according to a sixth embodiment of the present, Invention. FIG. 26 Is a section of the image reading device; FIG. 27 is a view in perspective schematically showing an enlargement of a displacing mechanism which moves a film holder; FIG. 28 is a diagram showing the principle whereby the film holder is attracted magnetically.

In the image reading device according to the sixth embodiment, there is a difference from the fifth embodiment only in that a film holder drive member 133 is formed of a magnetic material, and in that the drive member 133 is also provided with a magnet 134 at the end opposite to the driven pulley 128. In this case, a magnetic field is set tip as indicated by the reference material 135 in FIG. 28 so that the rail 121 of the holder 105 is attracted, as in the device of the fifth embodiment. Further, according to the sixth embodiment, the drive member 133 may be constructed of a magnetic metal such as iron or the like, and it is therefore easily manufactured. Apart from these points, the image reading device is identical to that of the fifth embodiment. Identical reference numerals to those of the fifth embodiment have therefore been used in FIG. 26 to FIG. 28, and a description of the corresponding parts is omitted.

Seventh Embodiment

Figure 29:
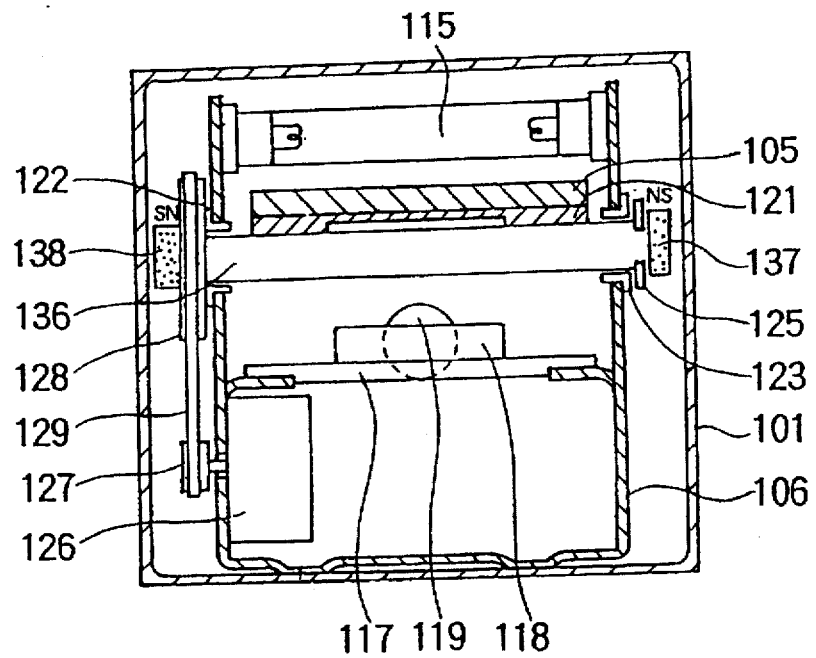
FIG. 29 is a section of an image reading device according to a seventh embodiment of the present invention.
Figure 30:
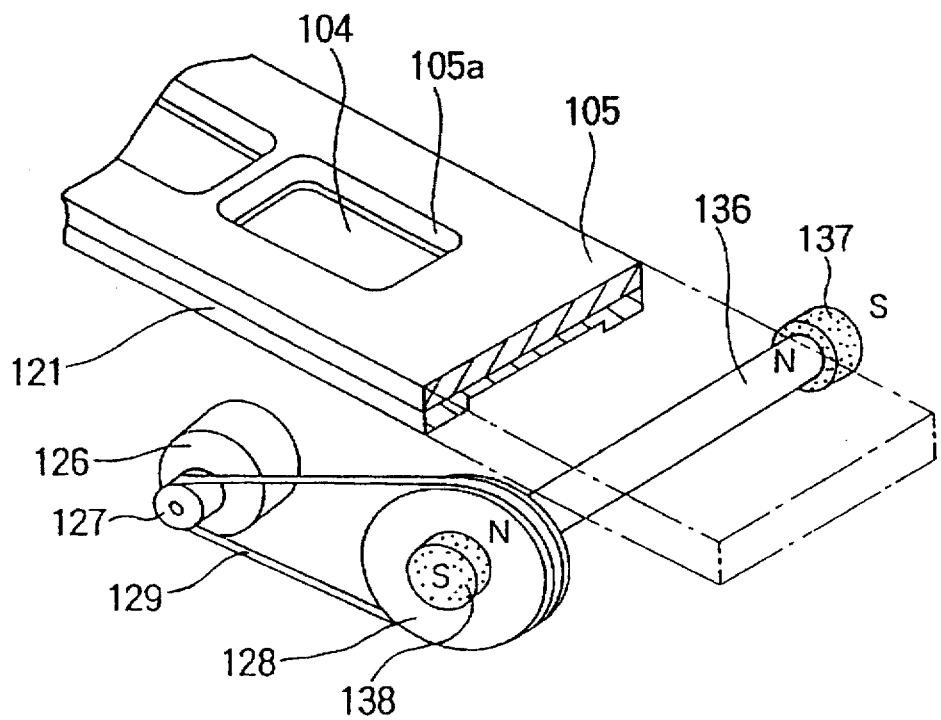
FIG. 30 is a perspective view schematically showing an enlargement of a moving mechanism which moves a film holder according to the seventh embodiment.
Figure 31:
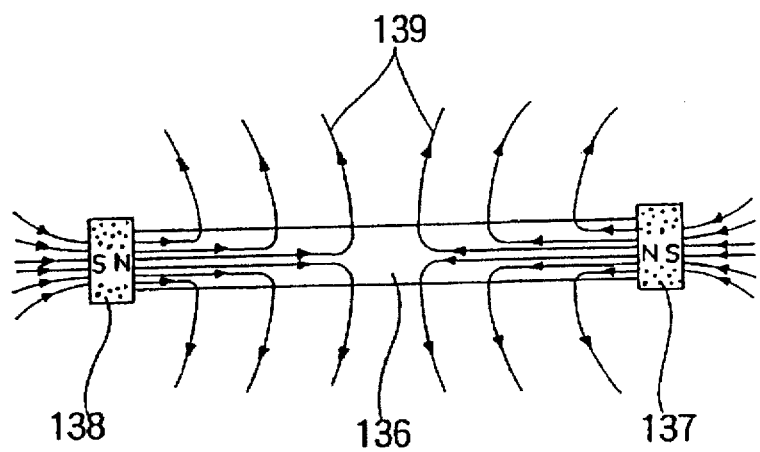
FIG. 31 is a diagram showing the principle whereby the film holder of the seventh embodiment is magnetically attracted.

FIG. 29 to FIG. 31 relate to an image reading device according to a seventh embodiment of the present invention. FIG. 29 is a section of the image reading device; FIG. 30 is a view in perspective schematically showing an enlargement of a displacing mechanism which moves a film holder; and FIG. 31 is a diagram showing the principle whereby the film holder is attracted magnetically.

In the image reading device of the seventh embodiment, there is a difference from the fifth embodiment only in that a film holder drive member 136 is formed of a magnetic material, and in that permanent magnets 137, 138 are provided at both ends of the drive member 136 with similar poles (N in FIG. 30) facing each other. In this case, as N poles are facing each other, all the magnetic flux of the magnets 137, 138 passes through the outer circumference of the drive member 136 as indicated by the reference numeral 139 in FIG. 31, and does not leak from the ends of the drive member 136. Consequently, as the magnetic flux intensity on the outer circumferential surface of the drive member 136 is high, the rail 121 of the holder 105 is held against the drive member 136 by a strong attractive force, causing a large frictional force to act between the rail 121 and the drive member 136. Further, according to the seventh embodiment, the drive member 136 may be constructed of a magnetic metal such as iron or the like, and it is therefore easily manufactured. Apart from these points, the image reading device is identical to that of the fifth embodiment. Identical reference numerals to those of the fifth embodiment have therefore been used in FIG. 29 to FIG. 31, and a description of the corresponding parts is omitted.

Eighth Embodiment

Figure 32:
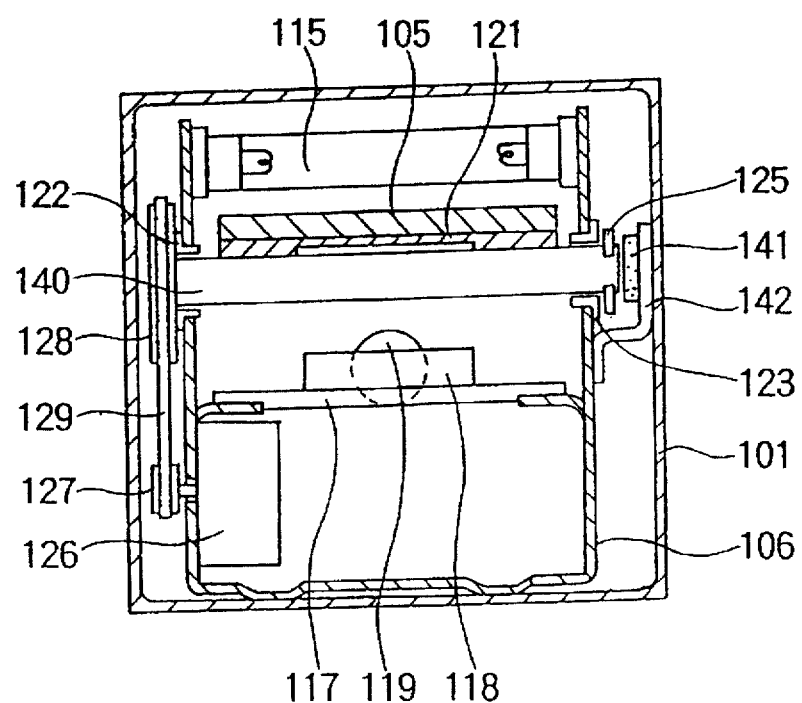
FIG. 32 is a section of an image reading device according to an eighth embodiment of the present invention.
Figure 33:
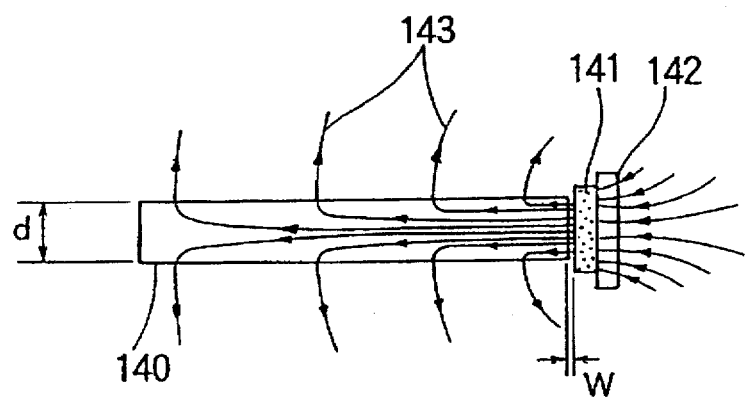
FIG. 33 is a diagram showing the principle whereby a film holder of the eighth embodiment is magnetically attracted.

FIG. 32 and FIG. 33 relate to an image reading device according to an eighth embodiment of the present invention. FIG. 32 is a section of the image reading device and FIG. 33 is a diagram showing the principle whereby a film holder is attracted magnetically.

In the image reading device of the eighth embodiment, there is a difference from the fifth embodiment only in that a film holder 140 is formed of a magnetic material, and in that a magnet 141 is provided at a small distance W from the end of the drive member 140 opposite to the driven pulley 128, by means of a supporting member 142 fixed to the frame 106. This interval W preferably lies in the range 0<W≦d/2 where d is the diameter of the drive member 140. In this case, a magnetic field is set up as indicated by the reference numeral 143 in FIG. 33, so that the rail 121 of the holder 105 is attracted to the drive member 140 as in the fifth embodiment. Further, according to the eighth embodiment, as the magnet 141 does not come into contact with the drive member 140, there is no severe limitation on the shape of the magnet 141; there is no risk of unbalance even If the attachment position of the magnet 141 is offset with respect to the center axis of the drive member 140; and the device can be easily manufactured.

Apart from these points, the device is identical to the image reading device of the fifth embodiment. Identical reference numerals to those of the fifth embodiment have therefore been used in FIG. 32 and FIG. 33, and a description of the corresponding parts is omitted.

Ninth Embodiment

Figure 34:
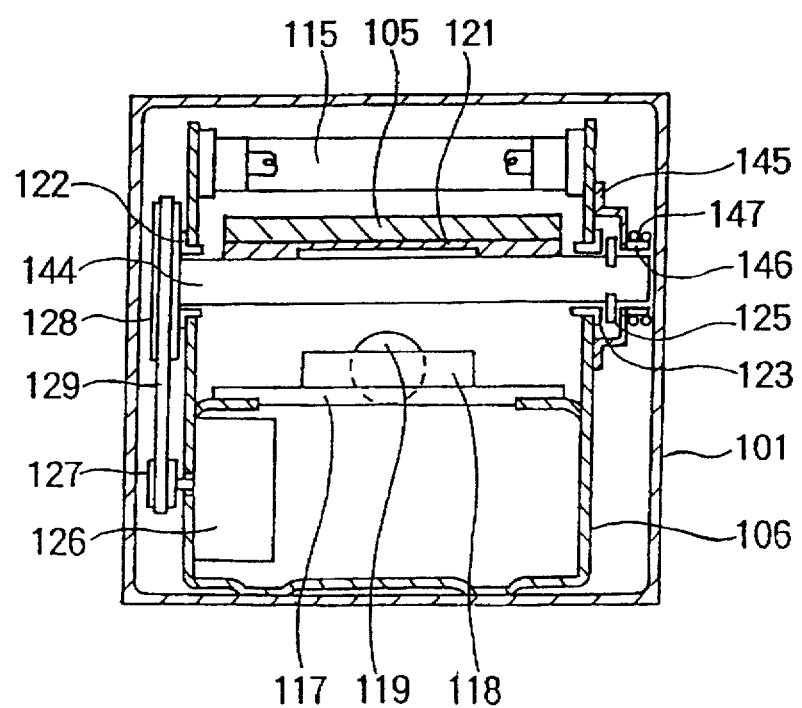
FIG. 34 is a section of an image reading device according to a ninth embodiment of the present invention.
Figure 35:
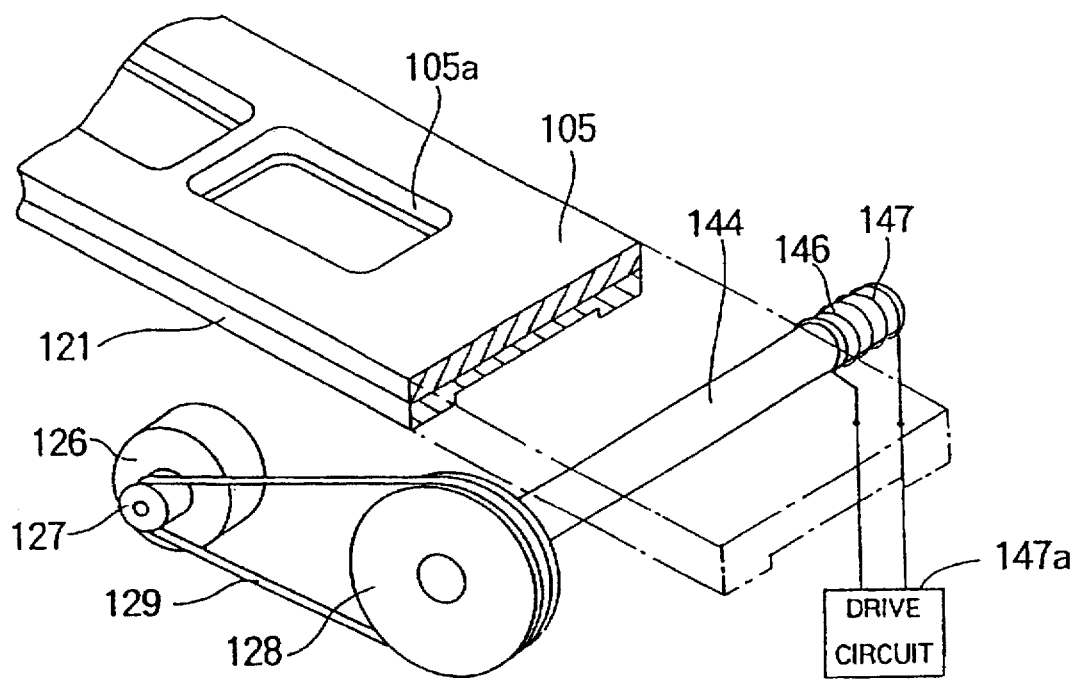
FIG. 35 is a perspective view schematically showing an enlargement of a moving mechanism which moves a film holder according to the ninth embodiment.

FIG. 34 and FIG. 35 relate to an image reading device according to a ninth embodiment. FIG. 34 is a section of the image reading device and FIG. 35 is a view in perspective schematically showing an enlargement of a displacing mechanism which moves a film holder.

The image reading device of the ninth embodiment differs from that of the fifth embodiment only in that a film holder drive member 144 is formed of a magnetic material, and in that the device comprises a bobbin base 145 attached to the frame 106 at the end of the drive member 144 opposite to the driven pulley 128, a cylindrical bobbin 146 fixed to the bobbin base 145 such that there is a minute gap between the bobbin 146 and the outer circumference of the end of the drive member 144, a coil 147 which is wound on the outer circumference of this bobbin 146, and a drive circuit 147a which passes electrical current through the coil 147. In this case, the rail 121 of the holder 105 is attracted to the drive member 144 as in the fifth embodiment. Further, according to the ninth embodiment, if the current passing through the coil 147 is stopped when it is desired to attach or detach the holder 105 to or from the chassis 101, the holder 105 may be easily attached or detached without the need for much force. Apart from these points, the image reading device is identical to that of the fifth embodiment. Identical reference numerals to those of the fifth embodiment have therefore been used in FIG. 34 and FIG. 35, and a description of the corresponding parts is omitted.

Tenth Embodiment

In the image reading device according to the sixth embodiment shown in FIG. 26 to FIG. 28, the film holder drive member 133 is formed of a magnetic material, and the magnet 134 is provided at the end of the drive member 133 opposite to the driven pulley 128. However the driven pulley 128 itself may be a magnet which obviates the need for the magnet 134. In this case, the film holder is attracted to the drive member as in the sixth embodiment, and as there is no need for a space to attach the magnet. Thus the device may be made more compact.

Eleventh Embodiment

Figure 36:
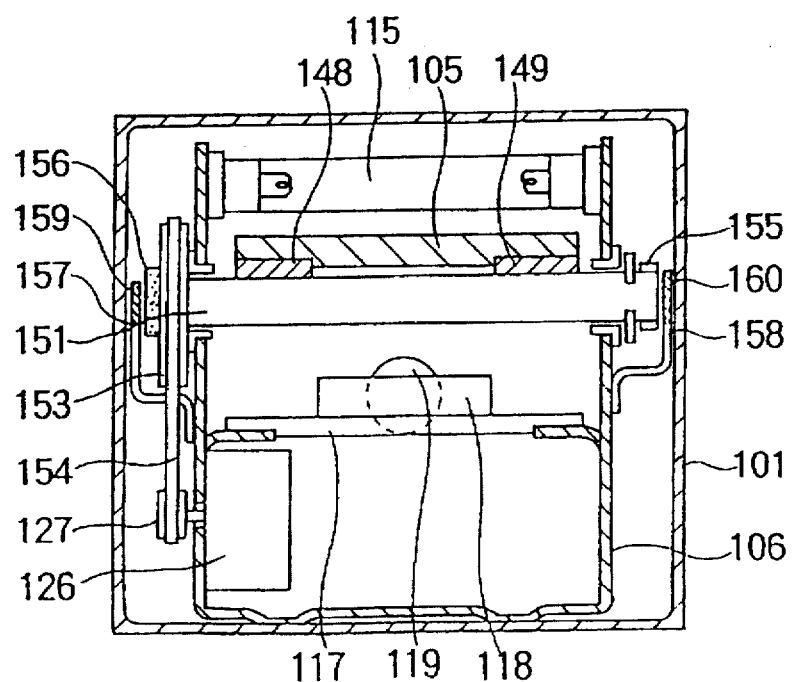
FIG. 36 is a schematic section of an image reading device according to an eleventh embodiment of the present invention.
Figure 37:
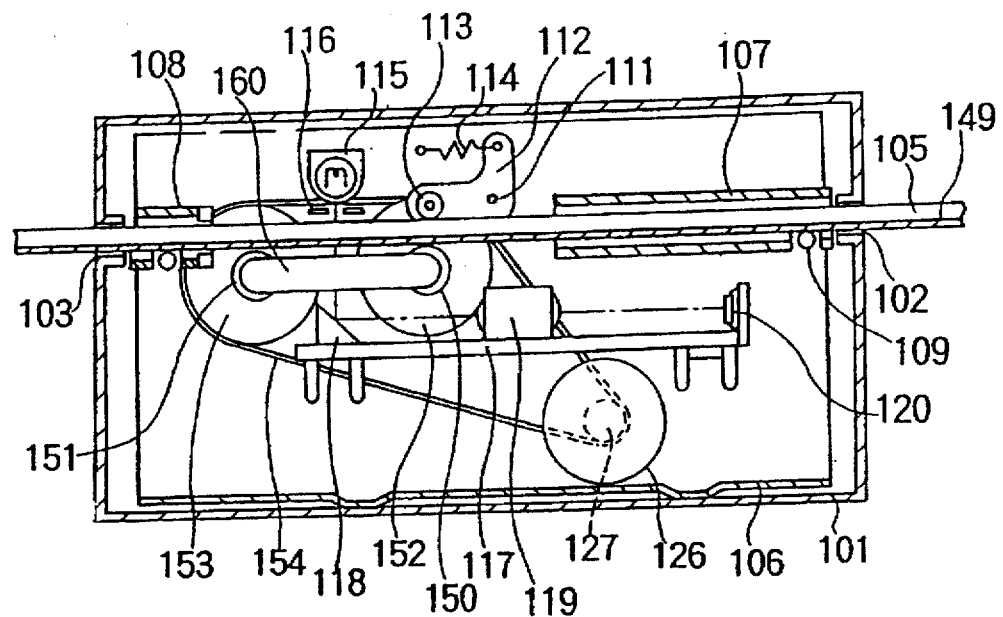
FIG. 37 is a schematic section of the image reading device according to the eleventh embodiment.
Figure 38:
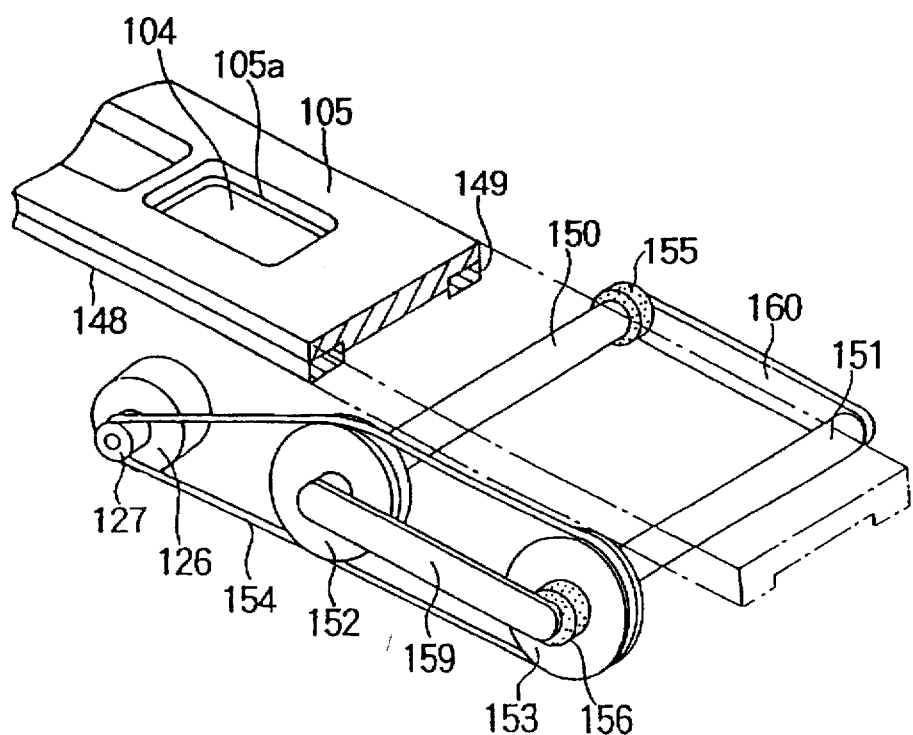
FIG. 38 is a perspective view schematically showing an enlargement of a moving mechanism which moves a film holder according to the eleventh embodiment.
Figure 39:
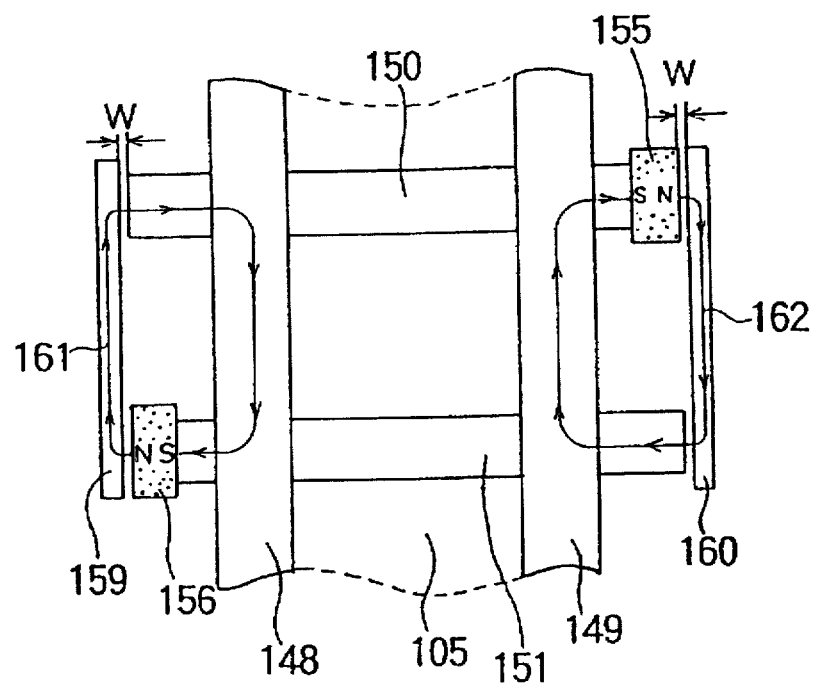
FIG. 39 is a diagram showing the principle whereby the film holder of the eleventh embodiment is magnetically attracted.

FIG. 36 to FIG. 39 relate to an image reading device according to the eleventh embodiment. FIG. 36 and FIG. 37 are sections of the image reading device, FIG. 38 is a view in perspective schematically showing an enlargement of a displacing mechanism which moves a film holder; and FIG. 39 is a diagram showing the principle whereby the film holder is attracted magnetically.

In the eleventh embodiment, parts having the same construction as those of the fifth embodiment are given identical reference numerals, and their description is omitted. As shown in the figures, the image reading device of the eleventh embodiment differs from the fifth embodiment in that the rail of the film holder 105 does not have a U-shaped cross-section, and comprises two side rails 148, 149 fitted underneath the edges of the holder 105.

In the image reading device according to the eleventh embodiment, the displacing mechanism which moves the holder 105 comprises film holder drive members 150, 151 consisting of two magnetic bodies disposed parallel to each other and attached to the frame 106 such that they are free to turn, driven pulleys 152, 153 attached respectively to the drive members 150, 151, a belt 154 wound around these driven pulleys 152, 153, and a drive pulley 127 provided on the rotation axle of the motor 126. This displacing mechanism further comprises a magnet 155 attached to the end of the drive member 150 opposite to the driven pulley 152, a magnet 156 attached to the same end of the drive member 151 as the driven pulley 153, stays 157, 158 (shown only in FIG. 36) fixed to the frame 106, a yoke 159 constructed of a magnetic material fixed to the stay 157, and a yoke 160 constructed of a magnetic material fixed to the stay 158. The yoke 159 is opposite to and situated at a predetermined distance W from the end of the drive member 150 and the magnet 156 fixed to the drive member 151. The yoke 160 is opposite to and situated at a predetermined distance W from the magnet 155 fixed to the drive member 150 and the end of the drive member 151. The distance W is preferably set such that $0<W\leq d/2$, where d is the diameter of the drive members 150, 151.

When the holder 105 is inserted in the chassis 101 from the inlet 102, as shown in FIG. 39, the side rails 148, 149 come into contact with the drive members 150, 151, and magnetic circuits are set up as indicated by the reference numerals 161, 162. The side rails 148, 149 are therefore attracted magnetically by the drive members 150, 151, the drive members 150, 151 are rotated, and the attached holder 105 is displaced by the frictional force.

According to the eleventh embodiment, a larger attractive force is obtained from the two drive members 150, 151 than is obtained in the case of only one drive member. Slipping between the holder 105 and the drive members 151, 152 therefore does not easily occur, and high precision scanning may be performed.

Further, as the side rails 148, 149 of the holder are attracted by two drive members, the holder 105 can be moved steadily which further improves the scanning precision.

Instead of providing the yokes 159, 160 constructed of a magnetic material, the chassis 101 may be constructed of a magnetic material which is made to approach the drive members 150, 151 arid the magnets 155, 156, in which case the construction of the device may be simplified. Apart from the above points, the image reading device is identical to that of the fifth embodiment.

Twelfth Embodiment

Figure 40:
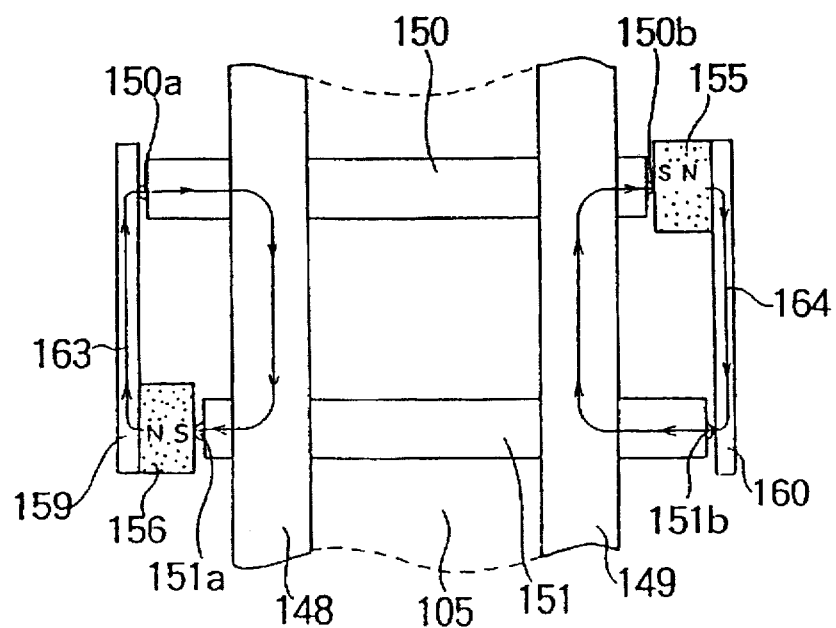
FIG. 40 is a diagram showing the construction of an image reading device and the principle of magnetic attraction according to a twelfth embodiment of the present invention.

FIG. 40 is a diagram showing the construction of an image reading device according to a twelfth embodiment of the present invention.

In the device according to the twelfth embodiment, identical reference numerals have been used to indicate parts of the construction which are identical to or correspond to those of the eleventh embodiment. The device differs from the eleventh embodiment only in that the magnet 156 is attached to the yoke 159, the magnet 155 is attached to the yoke 164, projections 150a, 150b which project by an amount d (where $0<d\leq d/2$, d being the diameter of the drive member) are provided in the center of each end of the drive member 150, and projections 151a, 151b which project by an amount d are provided in the center of each end of the drive member 151. According to the twelfth embodiment, magnetic circuits are set up as indicated by the reference numerals 163, 184 in FIG. 40. The side rails 148, 149 are therefore attracted magnetically by the drive members 150, 151, and when the drive members 150, 151 are rotated, the holder 105 is displaced by the frictional force.

According to the twelfth embodiment, a larger attractive force is obtained from the two drive members 150, 151 than in the case of only one drive member. Slipping between the holder 105 and the drive members 150, 151 therefore does not easily occur, and high precision scanning may be performed.

Further, as the side rails 148, 149 of the holder 105 are attracted by two drive members, the holder 105 can be moved steadily which further improves the scanning precision.

Instead of providing the yokes 159, 160 constructed of a magnetic material, the chassis 101 may be constructed of a magnetic material which is made to approach the drive members 150, 151 and the magnets. 155, 156, in which case the construction of the device may be simplified.

Even if the attachment positions of the yokes 163, 164 and of the magnet 155 are offset, the magnet 155 attached to the yoke 160 and the yoke 159 respectively come into contact with the projections 150b, 150a in the center of each end of the drive member 150, so the frictional force acting on the contact area is reduced.

Likewise, even if the attachment positions of the yokes 163, 164 and of the magnet 156 are offset, the magnet 156 attached to the yoke 159 and the yoke 160 respectively come into contact with the projections 151a, 151b in the center of each end of the drive member 151, so the frictional force acting on the contact area is similarly reduced.

Thirteenth Embodiment

In the devices of the sixth embodiment to the twelfth embodiment, a rail constructed of a magnetic material is attached to the holder 105. The rail may however be constructed of a resin mixed with a powdered magnetic material, or the holder and the rail may be formed in a one piece construction of a resin mixed with a powdered magnetic material. In this case, the manufacturing process used for the holder, rail or side rails may be simplified.

Fourteenth Embodiment

Figure 41:
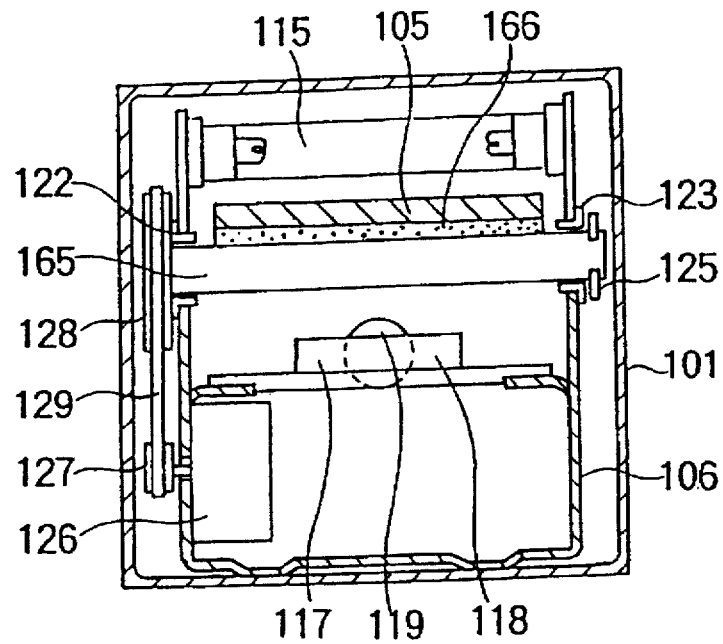
FIG. 41 is a section of an image reading device according to a fourteenth embodiment of the present invention.
Figure 42:
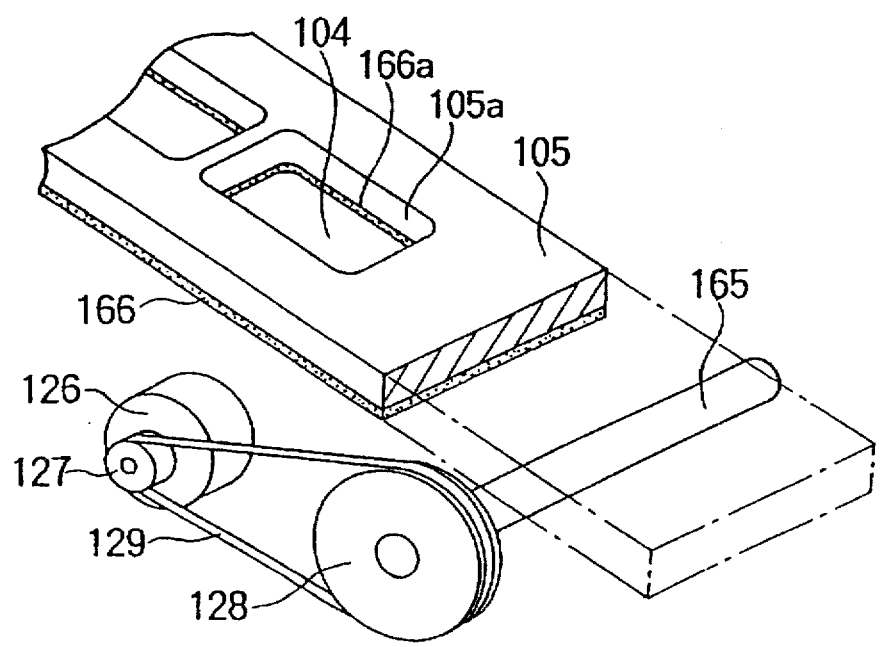
FIG. 42 is a perspective view schematically showing an enlargement of a moving mechanism which moves a film holder according to a fourteenth embodiment.

FIG. 41 and FIG. 42 relate to an image reading device of a fourteenth embodiment. FIG. 41 is a section of the image reading device and FIG. 42 is a view in perspective schematically showing an enlargement of a displacing mechanism which moves a film holder.

The image reading device according to the fourteenth embodiment differs from that of the fifth embodiment only in that a film holder drive member 165 is formed of a magnetic material, and in that the surface which comes into contact with the drive member 165 is provided not with a rail, but with a sheet type guide magnet 166. Numeral 166a indicates a window in the guide magnet 166 provided so as to coincide with the position of the window 105a in the holder 105.

According to the device of the fourteenth embodiment, an attractive force acts between the guide magnet 166 and the drive member 165 which is constructed of a magnetic material, therefore by rotating the drive member 165, the holder 105 may be displaced. In this case, the drive member 165 may be constructed of a magnetic body which is not a magnet, such as iron or the like, and hence the device may be manufactured at low cost. Apart from the above points, the device is identical to the image reading device of the fifth embodiment. Identical reference minerals to those of the fifth embodiment have therefore been used in FIG. 41 and FIG. 42, and a description of the corresponding parts is omitted.

Fifteenth Embodiment

According to the fourteenth embodiment, the guide magnet 166 was attached to the holder 105, however the holder 105 may itself consist of a plastic magnet. In this case the same effect as that of the fourteenth embodiment is obtained, and manufacture of the holder 105 is rendered easier.

Sixteenth Embodiment

Figure 43:
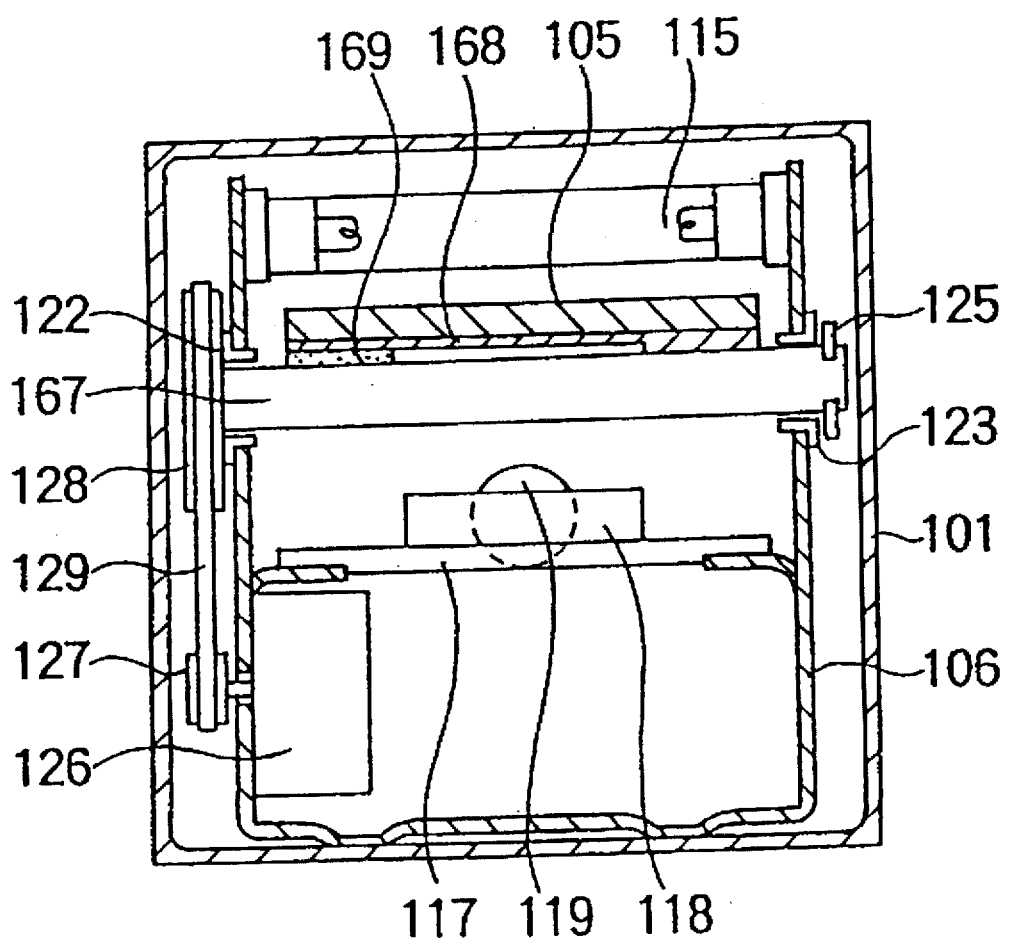
FIG. 43 is a section of an image reading device according to a sixteenth embodiment of the present invention.
Figure 44:
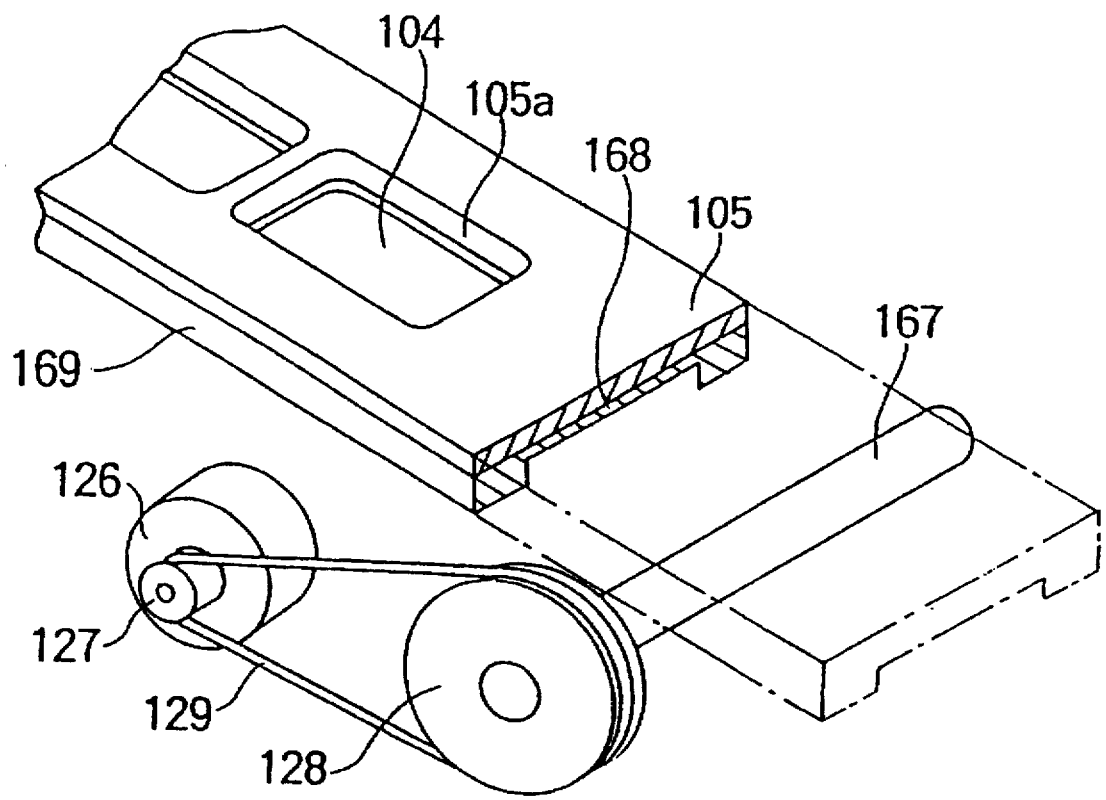
FIG. 44 is a perspective view schematically showing an enlargement of a moving mechanism which moves a film holder according to the sixteenth embodiment.
Figure 45:
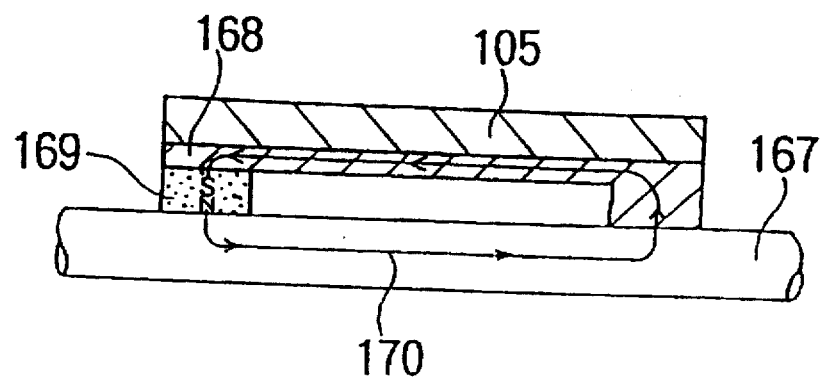
FIG. 45 is a diagram showing the principle whereby the film holder of the sixteenth embodiment is magnetically attracted.

FIG. 43 to FIG. 45 relate to an image reading device according to a sixteenth embodiment of the present invention. FIG. 43 is a section or the image reading device, FIG. 44 is a view In perspective showing an enlargement of a displacing mechanism which moves a film holder, and FIG. 45 is a diagram showing the principle whereby the film holder is attracted magnetically.

The image reading device of the sixteenth embodiment differs from that of the fifth embodiment only in that a film holder drive member 167 is formed of a magnetic material, in that a rail 168 constructed of a magnetic material and having an L-shaped cross-section is provided underneath the holder 105, and in that a rectangular rail magnet 169 is provided underneath this rail 168. In this case, a magnetic field is set up as indicated by the reference numeral 170 in FIG. 45 so that the rail 168 and rail magnet 169 of the holder 105 are attracted as in the device of the fifth embodiment. Further, as in the sixteenth embodiment the guide magnet is rod-shaped. Thus the magnet can be manufactured easily. Apart from the above points, the device is identical to the image reading device of the fifth embodiment. Identical reference numerals to those of the fifth embodiment have therefore been used in FIG. 43 to FIG. 45, and a description of the corresponding parts is omitted.

Seventeenth Embodiment

Figure 46:
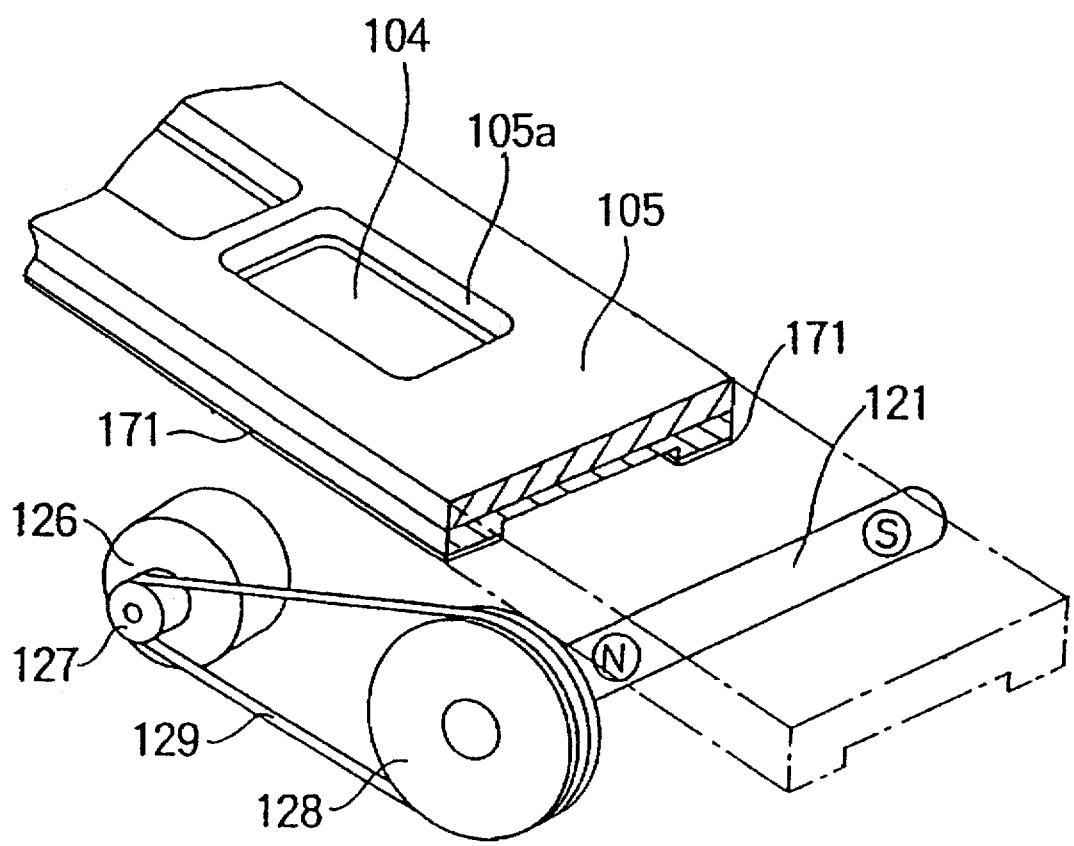
FIG. 46 is a perspective view schematically showing an enlargement of a moving mechanism which moves a film holder according to a seventeenth embodiment of the present invention.
Figure 47:
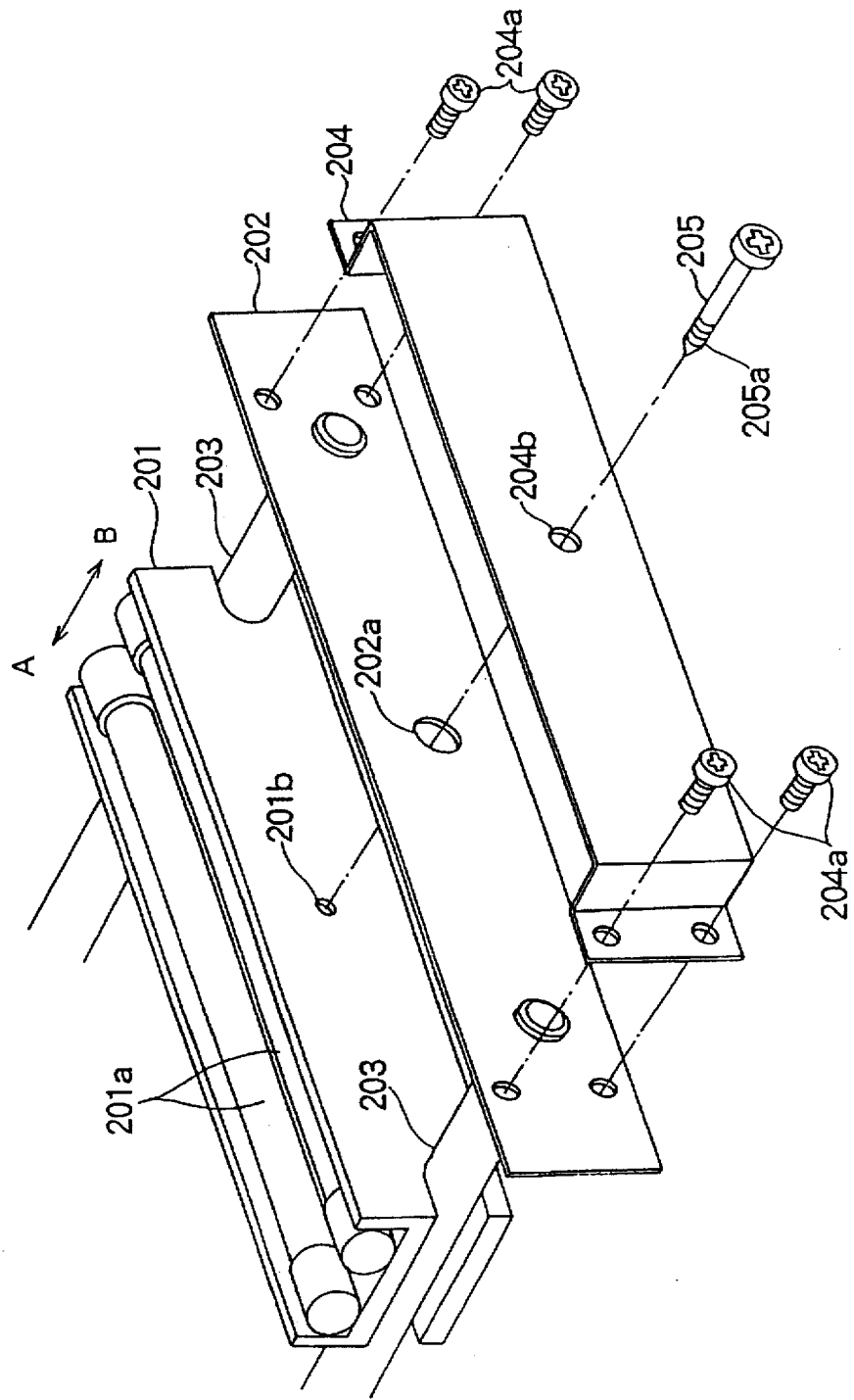
FIG. 47 is a perspective view showing the essential features of a holding mechanism of a reading unit of a conventional image reading device.
Figure 48:
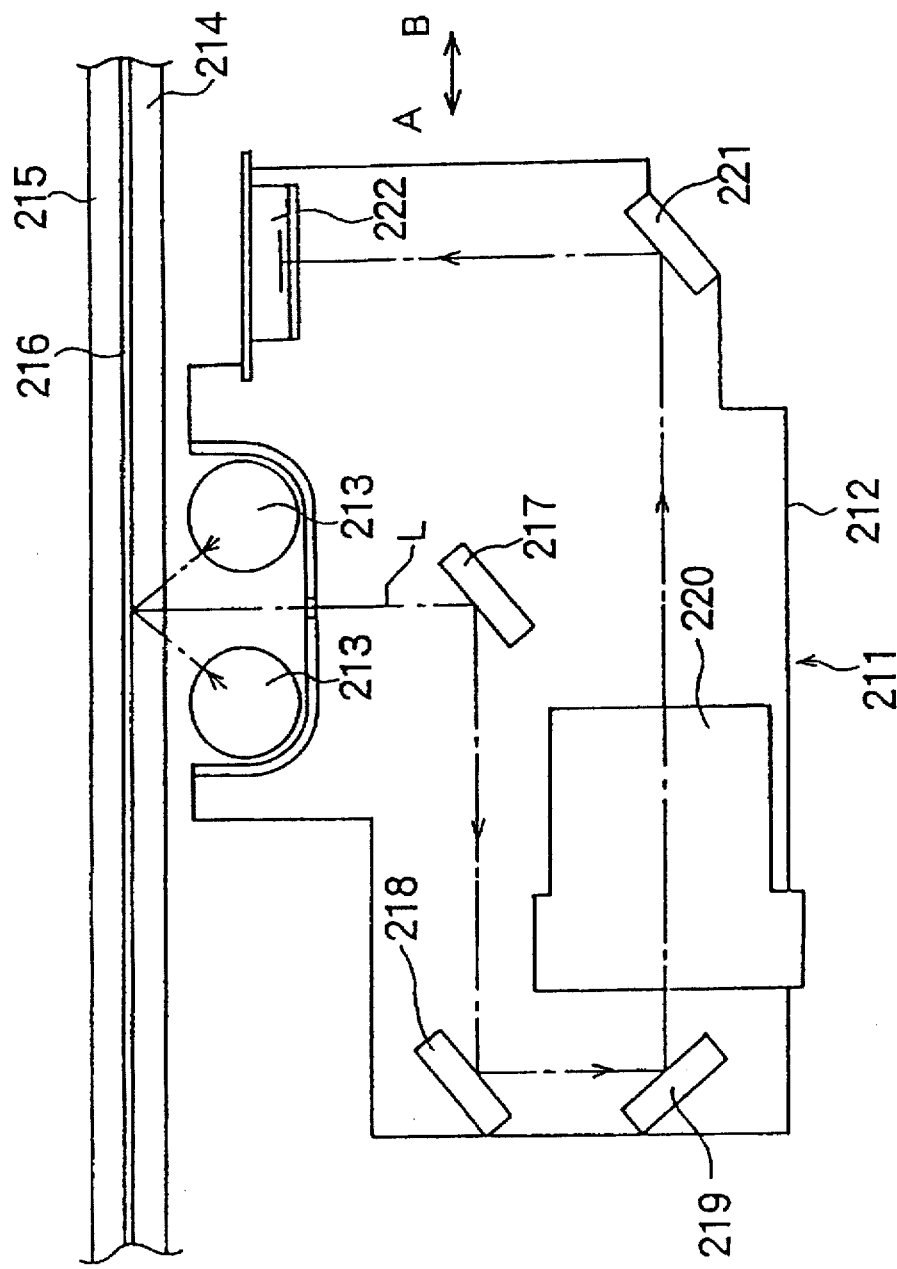
FIG. 48 is a section schematically showing the structure of the reading unit of a conventional image reading device.
Figure 49:
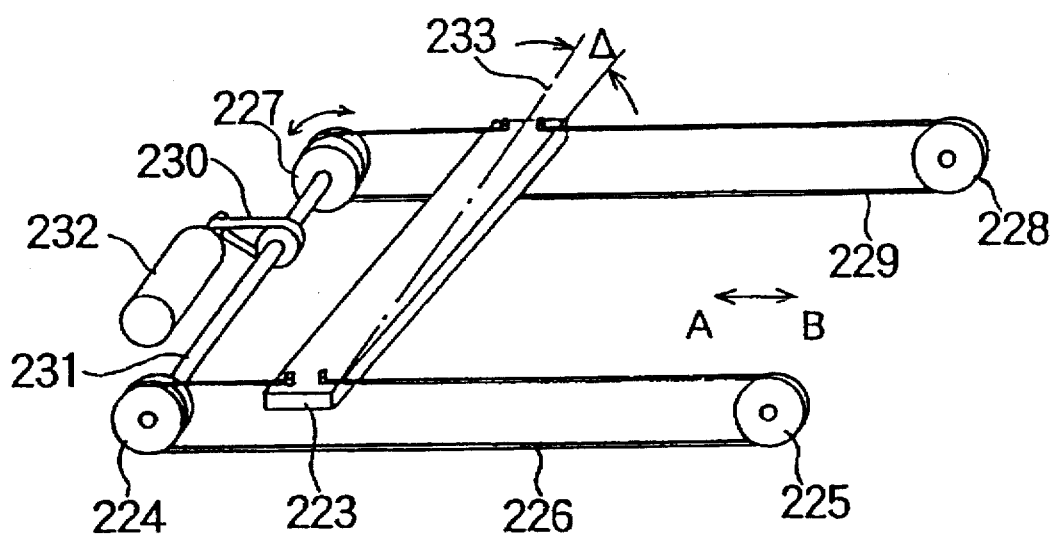
FIG. 49 is a perspective view of a moving mechanism acting on optical parts used in a reducing or magnifying mechanism of the reading unit in FIG. 48.
Figure 50:
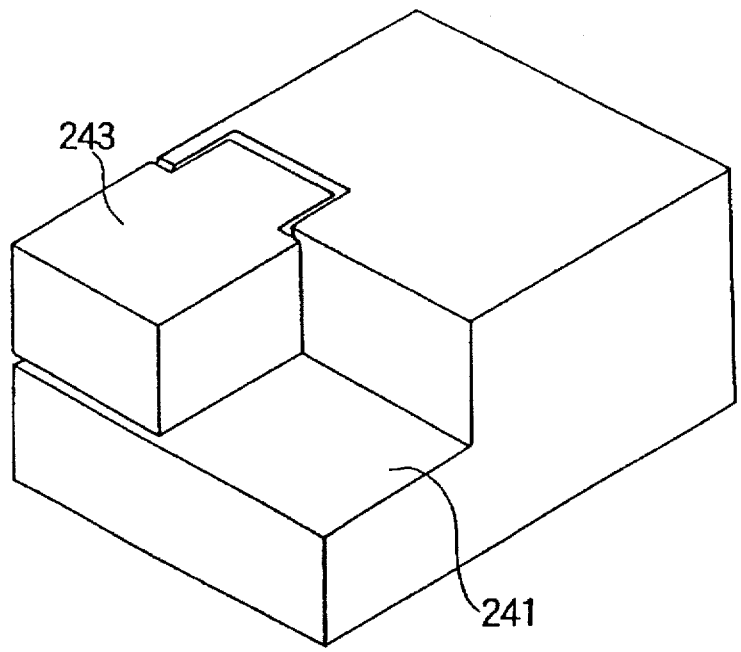
FIG. 50 is a perspective view schematically showing the external appearance of another conventional image reading device.
Figure 51:
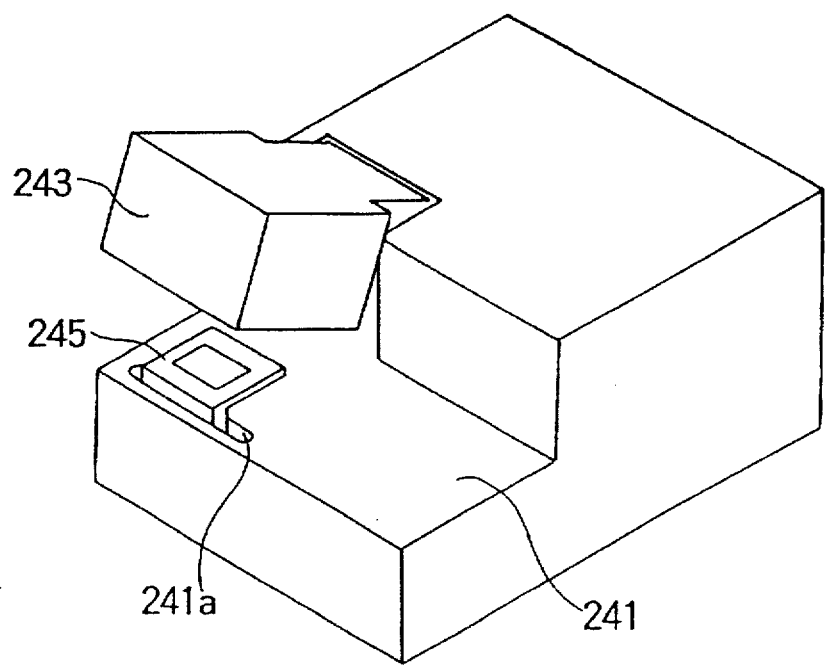
FIG. 51 is a perspective view schematically showing the external appearance of yet another conventional image reading device.
Figure 52:
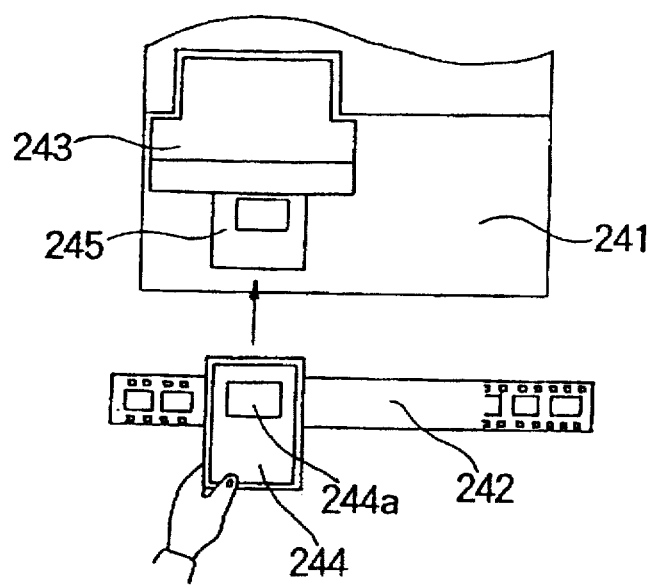
FIG. 52 to FIG. 54 are diagrams showing the procedure whereby a film is inserted in the film holder and mounted on a stage in the image reading device of FIG. 50
Figure 53:
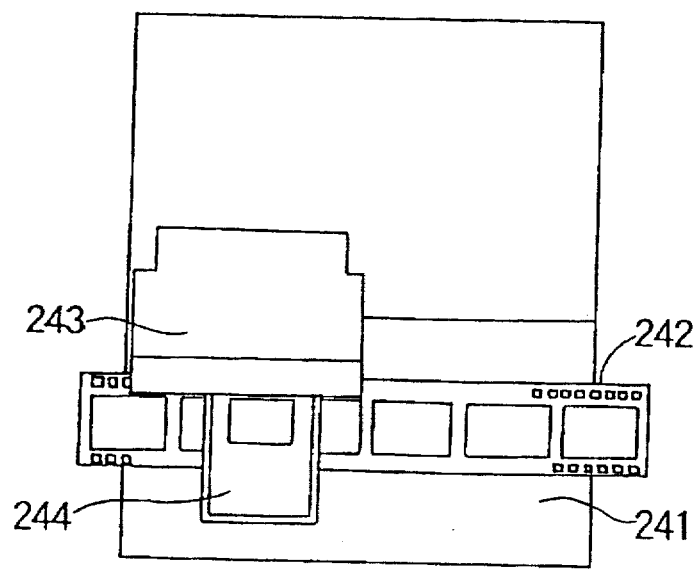
Figure 54:
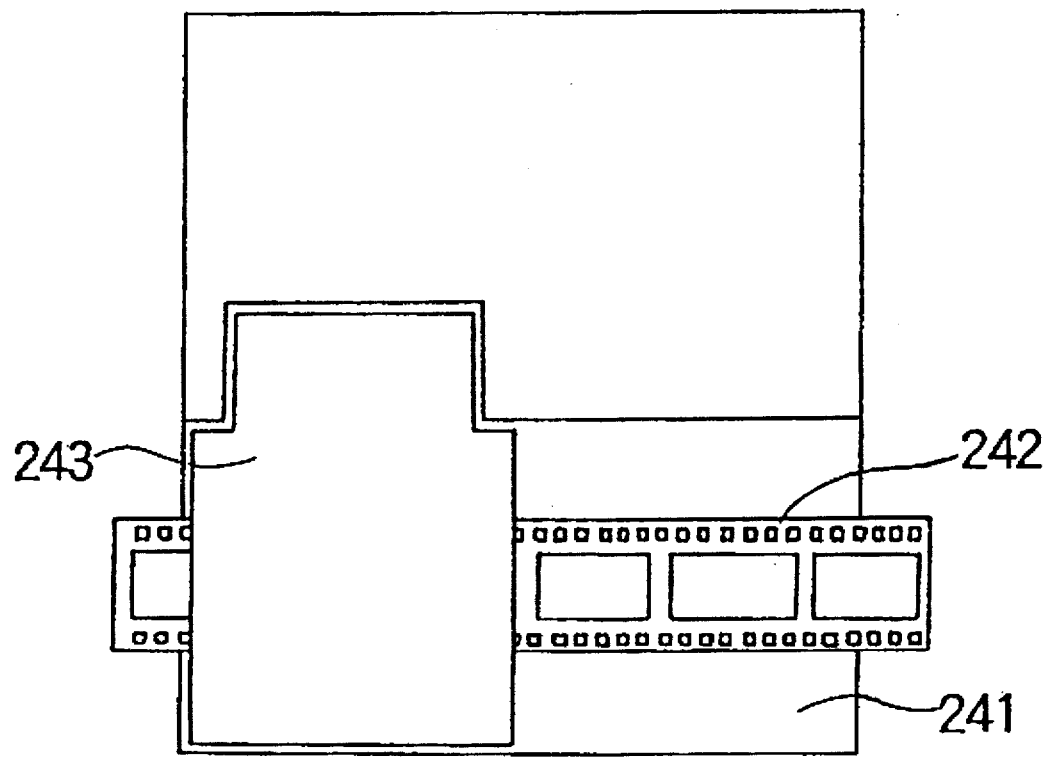
Figure 55:
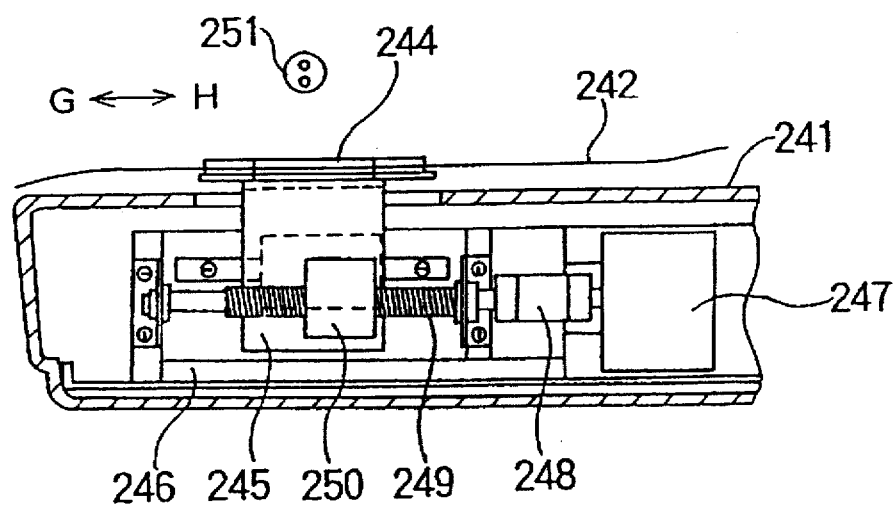
FIG. 55 is a section schematically showing the structure of a drive part of the stage in the image reading device of FIG. 50.
Figure 56:
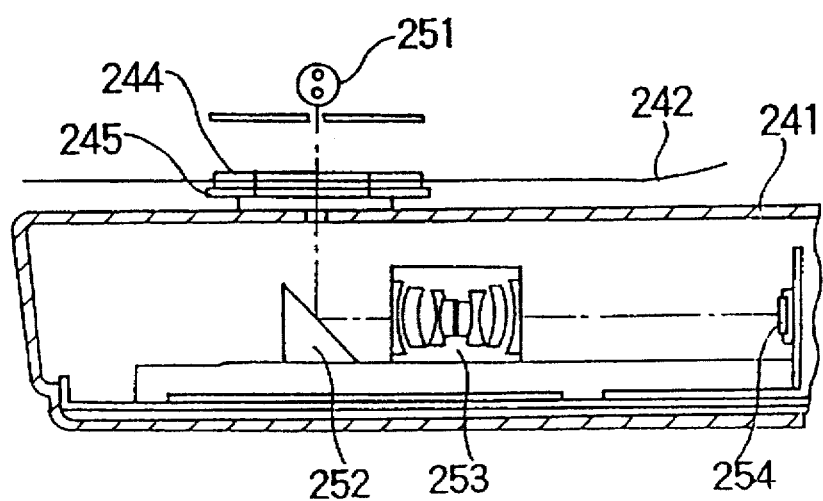
FIG. 56 is a section schematically showing the structure of an optical system used for reading the image on the film in the image reading device of FIG. 50.

FIG. 46 is a view in perspective showing an enlargement of a displacing mechanism which moves a film holder according to a seventeenth embodiment.

In FIG. 46, parts having the same construction as those of FIG. 21 showing the fifth embodiment are given identical reference numerals. The image reading device of the seventeenth embodiment differs only from that of the fifth embodiment in that a thin elastomer resin 171 is provided on the surface of the rail 121 underneath the holder 105 which comes into contact with the drive member 124. According to this embodiment, due to the elastomer resin 171 covering the rail 121, a large frictional force acts between the drive member 124 and the elastomer resin 171 when the holder 105 is attracted to the drive member 124. Slipping between the holder 105 and the drive member 124 therefore does not easily occur, and high precision scanning may be performed.

In the above description, the case has been described where the elastomer resin 171 was used in the fifth embodiment, but it may equally well be applied to any of the embodiments from the sixth embodiment to the sixteenth embodiment. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image device comprising:

a frame;

a reading unit provided with a line sensor for reading a text image;

a guide member, fixed to said frame, for supporting said reading unit such that said reading unit is free to slide in a predetermined direction; and a stay fixed to said frame, wherein a screwhole is formed at a predetermined position in said reading unit, a first throughhole is formed in said frame coaxially with said screwhole, and a second throughhole is formed in said stay, coaxially with both said screwhole and said first throughhole, and wherein an elastic member, having a third throughhole, is engaged with said first throughhole in said frame, and a holding member is provided including a grip of large diameter and a screw of small diameter, such that said reading unit is fixed when the image reading device is transported by screwing said screw into said screwhole of said reading unit through said second throughhole of said stay and through said third throughhole of said elastic member.

2. An image reading device as defined in claim 1, further comprising:

a compression spring provided on the outer side of said stay, for pushing said holding member towards the outside of said image reading device; and a clip provided on said holding member, for contacting with the inner side of said stay when the screwhole of said reading unit and the screw of said holding member are disengaged.

3. An image reading device as defined in claim 1, wherein said screwhole of said reading unit is formed on a line passing through the center of gravity of said reading unit, or in the vicinity of said line.

4. An image reading device as defined in claim 1, further comprising:

a motor providing a drive force for driving said reading unit along said guide member; and a circuit board for processing a signal output by said line sensor, wherein said motor and said circuit board are installed in positions on the opposite side of the position at which said reading unit is fixed by said holding member.

5. An image reading device comprising:

a frame;

a reading unit including a line sensor for reading a text image;

a guide member, fixed to said frame, for supporting said reading unit such that said reading unit is free to slide in a predetermined direction; and a stay fixed to said frame, wherein a projection is provided at a predetermined position on said reading unit, a first throughhole is formed in said frame, and a second throughhole is formed in said stay coaxially with said first throughhole, wherein said image reading device further includes, a holding member passing through said first throughhole in said frame and said second throughhole in said stay, said holding member including a hook at an end and a grip on the outer side of said stay, said hook being rotated so as to engage with said projection by rotating said grip when said image reading device is transported, a compression spring provided on the outer side of said stay, for pushing said holding member towards the outside of said image reading device, and a clip provided on said holding member, for contacting with the inner side of said stay.

6. An image reading device as defined in claim 5, further comprising:

a motor providing a drive force for driving said reading unit along said guide member; and a circuit board for processing a signal output by said line sensor, wherein said motor and said circuit board are installed in positions on the opposite side to the position at which said reading unit is fixed by said holding member.

* * * * *